(12) United States Patent
Bhagath et al.

(10) Patent No.: US 9,796,032 B2
(45) Date of Patent: Oct. 24, 2017

(54) CUTTING INSERT AND INDEXABLE ROTARY CUTTING TOOL

(71) Applicant: TUNGALOY CORPORATION, Yoshima-Kogyodanchi, Iwaki-shi, Fukushima (JP)

(72) Inventors: Kedar Suresh Bhagath, Iwaki (JP); Yuji Shinjyo, Iwaki (JP); Isamu Saito, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 239 days.

(21) Appl. No.: 14/655,489

(22) PCT Filed: Dec. 26, 2013

(86) PCT No.: PCT/JP2013/084989
§ 371 (c)(1),
(2) Date: Jun. 25, 2015

(87) PCT Pub. No.: WO2014/104245
PCT Pub. Date: Jul. 3, 2014

(65) Prior Publication Data
US 2015/0352646 A1 Dec. 10, 2015

(30) Foreign Application Priority Data
Dec. 27, 2012 (JP) ................................. 2012-283942

(51) Int. Cl.
B23C 5/08 (2006.01)
B23F 21/14 (2006.01)
B23C 5/20 (2006.01)

(52) U.S. Cl.
CPC .............. B23F 21/146 (2013.01); B23C 5/08 (2013.01); B23C 5/207 (2013.01);
(Continued)

(58) Field of Classification Search
CPC ..... B23C 5/08; B23C 5/207; B23C 2200/203; B23C 2200/0438; B23C 2200/0433;
(Continued)

(56) References Cited

U.S. PATENT DOCUMENTS 4,699,549 A 10/1987 Shimomura et al.
5,622,460 A * 4/1997 Satran .................. B23C 5/1045
407/42

(Continued)

FOREIGN PATENT DOCUMENTS

CA 02214875 A 9/1997
JP 62039106 A * 2/1987
(Continued)

OTHER PUBLICATIONS

International Search Report dated Jul. 3, 2014 issued in PCT counterpart application (No. PCT/JP2013/084989).
(Continued)

*Primary Examiner* — Alan Snyder
(74) *Attorney, Agent, or Firm* — Womble Carlyle

(57) ABSTRACT

A cutting insert includes a cutting edge having an involute-curve approximate shape. A cutting edge is formed so as to wholly take on a first curved shape with a first curvature radius when the cutting insert is viewed from the end surface, and is formed so that a large part of the cutting edge takes on a second curved shape with a second curvature radius when the cutting insert is viewed from the side surface.

24 Claims, 31 Drawing Sheets

(52) U.S. Cl.
CPC .......... *B23C 2200/0438* (2013.01); *B23C 2200/128* (2013.01); *B23C 2200/203* (2013.01); *B23C 2200/367* (2013.01); *B23C 2210/168* (2013.01); *Y10T 407/1942* (2015.01); *Y10T 407/235* (2015.01); *Y10T 407/24* (2015.01); *Y10T 407/245* (2015.01)

(58) Field of Classification Search
CPC .......... B23C 2200/165; B23F 21/146; B23F 21/128; B23F 21/226
See application file for complete search history.

(56) References Cited

U.S. PATENT DOCUMENTS

| | | |
|---|---|---|
| 5,924,824 A | 7/1999 | Satran et al. |
| 6,024,519 A | 2/2000 | Okui et al. |
| 7,040,844 B1 | 5/2006 | Daiguji |
| 8,096,735 B2 * | 1/2012 | Sladek .......... B23C 5/2208 407/113 |
| 2011/0255925 A1 | 10/2011 | Yoshida |

FOREIGN PATENT DOCUMENTS

| | | |
|---|---|---|
| JP | H11-156625 A | 6/1999 |
| JP | H11-197934 A | 7/1999 |
| JP | 2005-066780 A | 5/2005 |

OTHER PUBLICATIONS

Written Opinon dated Jun. 27, 2015 issued in PCT counterpart application (No. PCT/JP2013/084989) with English translation.
International Preliminary Report on Patentability Chapter I dated Jun. 30, 2015 issued in PCT counterpart application (No. PCT/JP2013/084989).

* cited by examiner

CUTTING INSERT AND INDEXABLE ROTARY CUTTING TOOL

RELATED APPLICATIONS

This is a 371 US National Phase of International Patent Application No. PCT/JP2013/084989 filed Dec. 26, 2013, and published as WO2014/104245A1 on Jul. 3, 2014, which claims priority to JP 2012-283942, filed Dec. 27, 2012. The contents of the aforementioned applications are incorporated by reference in their entirety.

TECHNICAL FIELD

The present invention relates to a cutting insert and an indexable rotary cutting tool in which the cutting insert is detachably mounted. In particular, the present invention relates to a cutting insert for a gear cutting and an indexable rotary cutting tool, which are used for forming tooth spaces of a gear.

BACKGROUND ART

Conventionally, an indexable rotary cutting tool is used as a tool for forming tooth spaces of a gear. This tool includes a tool body having insert mounting seats disposed on both side end surfaces of the tool body, and a cutting insert is attached with a tightening screw from a side end surface side to each of the insert mounting seats. A cutting tooth form of the tool is the same as at least a part of a tooth space of the gear, and by machining the tooth space with the tool, the cutting tooth form is transferred directly to a work material as the shape of the tooth.

Patent Literature 1 discloses an example of the cutting insert used in a rotary cutting tool for a gear cutting as described above. As illustrated in FIG. 1A to FIG. 1C, in this cutting insert, an intersecting ridgeline portion between an upper surface and a side surface is formed as a cutting edge; the side surface serves as a rake face; the upper surface serves as a flank; and a lower surface serves as an insert seating surface. The cutting edge is convex toward the upper surface side in a side view (see FIG. 1C) of this cutting insert viewed from the side surface on which the cutting edge is formed at the edge portion. Thus, this upper surface has a curved shape that corresponds to the convex shape of the cutting edge. According to a description of Patent Literature 1, the cutting edge is formed into the shape of an involute tooth profile that is machined with a rotational path of the tool body around the axis.

CITATION LIST

Patent Literature

PTL 1: Japanese Patent Laid-Open No. 2005-66780

SUMMARY OF INVENTION

Technical Problem

Incidentally, a considerable amount of cost is necessary to precisely form the cutting edge into the involute-curve shape in the cutting insert described above. This is because the involute curve is a complicated curve line with a gradually changing curvature, so that highly sophisticated techniques and long manufacturing time are necessary to precisely form the cutting edge into such an involute curve. Thus, for a cutting insert for a gear cutting, there is a demand for a cutting edge which can be formed in an easier manner at a lower cost.

Conventionally, studies have been carried out on forming the cutting edge for machining tooth spaces into shapes other than the involute-curve shape. However, there is room for improvement in the conventionally devised cutting edge in terms of a similarity of the shape of the cutting edge to an involute curve.

The present invention has been made in view of the circumstances described above, and an object of the present invention is to provide a cutting insert including a cutting edge that can be used to form tooth spaces of a gear.

Furthermore, a further object of the present invention is to provide an indexable rotary cutting tool in which such a cutting insert can be detachably mounted, which is used for forming tooth spaces of a gear.

Solution to Problem

According to one aspect of the present invention, there is provided:

a cutting insert including a first end surface, a second end surface being opposite to the first end surface, and a peripheral side surface extending between the first end surface and the second end surface, in which at least one cutting edge having an arc shape is formed on an intersecting ridgeline portion between the peripheral side surface and at least one of the first end surface and the second end surface, and the cutting edge is formed so as to follow one first curved shape having a constant first curvature radius when the cutting insert is viewed from the end surface thereof, and is formed so that at least over half the cutting edge follows one second curved shape having a constant second curvature radius when the cutting insert is viewed from the side surface thereof.

It is preferable that the cutting edge is formed so as to wholly take on the first curved shape with the first curvature radius when the cutting insert is viewed from the end surface thereof, and is formed so that a large part of the cutting edge takes on the second curved shape with the second curvature radius when the cutting insert is viewed from the side surface thereof. It is preferable that the first curvature radius differs from the second curvature radius.

It is further preferable that, in the case where the center of a first circle partially having an arc is defined on the assumption that the cutting edge is regarded as the arc when the cutting insert is viewed from the end surface thereof, and the center of a second circle partially having an arc is defined on the assumption that at least over half the cutting edge is regarded as this arc when the cutting insert is viewed from the side surface thereof, the center of the second circle is located apart from a first plane represented as a straight line passing through a point bisecting the cutting edge having the arc shape and the center of the first circle when the cutting insert is viewed from the end surface thereof. In this case, it is preferable that the center of the second circle is located at either one of two areas separated by the first plane. However, it may be possible that the center of the second circle is located on the first plane.

In one embodiment, it may be possible that the cutting edge has a convexly curved shape when the cutting insert is viewed from the end surface thereof, and also has a convexly curved shape when the cutting insert is viewed from the side surface thereof. Alternatively, it may be possible that the cutting edge has a concavely curved shape when the cutting insert is viewed from the end surface thereof, and also has a concavely curved shape when the cutting insert is viewed from the side surface thereof.

It is preferable that a pair of first cutting edges, which are opposite to each other, are each formed as the cutting edge described above on an intersecting ridgeline portion between the first end surface and the peripheral side surface, and a pair of second cutting edges, which are opposite to each other, are each formed on an intersecting ridgeline portion between the second end surface and the peripheral side surface. It is preferable to form the first cutting edge and the second cutting edge so as to be symmetrical with respect to a plane. More preferably, a recessed portion is formed on at least one of the first end surface and the second end surface. It is preferable that the recessed portion has a bottom portion formed into a flat plane. Note that the peripheral side surface may be formed substantially at a right angle with respect to the first end surface.

According to another aspect of the present invention, there is provided an indexable rotary cutting tool including a tool body including two substantially circular side end surfaces and an outer peripheral portion provided between the side end surfaces, and having plural insert mounting seats arranged in the circumferential direction around a rotational axis extending so as to penetrate the two side end surfaces, a cutting insert being detachably mounted on each of the insert mounting seats, in which each of the cutting inserts is the cutting insert having the configurations as described above, the first end surface or the second end surface of the cutting insert is brought into contact with a seating surface of each of the insert mounting seats when the cutting insert is mounted on the insert mounting seat, and the seating surface of the insert mounting seat is formed in a sloped manner such that, in the case where a plane, which is perpendicular to the rotational axis and extends at the center between both of the side end surfaces of the tool body, is defined, a distance from the plane to the seating surface of the insert mounting seat in a direction along the rotational axis gradually increases with an increasing distance toward a front side in a tool rotational direction.

Furthermore, it is preferable that, in the case where the recessed portion is formed on at least one of the first end surface and the second end surface of the cutting insert, a raised portion that can be inserted into the recessed portion of the cutting insert is formed on the seating surface of the insert mounting seat. In particular, it is preferable that, when the cutting insert is mounted on the insert mounting seat, a top portion of the raised portion of the insert mounting seat is brought into contact with a bottom portion of the recessed portion of the cutting insert. It is preferable that, in the case where the bottom portion of the recessed portion of the cutting insert is a flat surface, the flat top portion of the raised portion of the insert mounting seat is brought into contact with the bottom portion of the recessed portion of the cutting insert when the cutting insert is mounted on the insert mounting seat.

Advantageous Effects of Invention

According to an aspect of the present invention having the configurations described above, the cutting edge of the cutting insert is formed so as to follow one first curved shape having a constant first curvature radius when the cutting insert is viewed from the end surface thereof, and is formed so that at least over half the cutting edge follows one second curved shape having a constant second curvature radius when the cutting insert is viewed from the side surface thereof. Thus, it is possible to provide the cutting edge with a shape highly similar to an involute curve. Therefore, the cutting insert according to one aspect of the present invention can be preferably used for forming tooth spaces of a gear.

DESCRIPTION OF EMBODIMENTS

Hereinbelow, an embodiment of a cutting insert and a cutting tool according to the present invention will be described in detail with reference to the drawings.

Figure 1A:
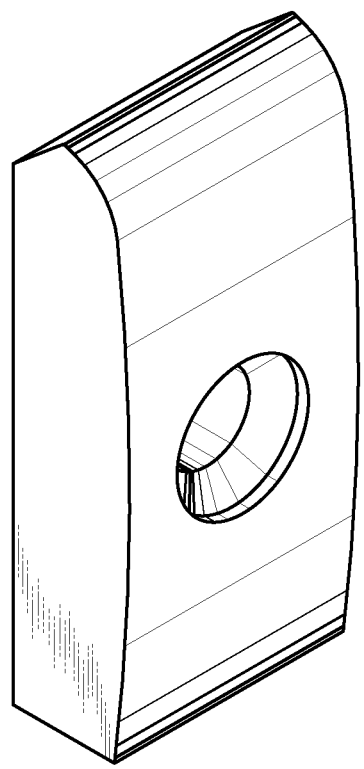
FIG. 1A is a perspective view illustrating an example of a conventional cutting insert for a gear cutting.
Figure 1B:
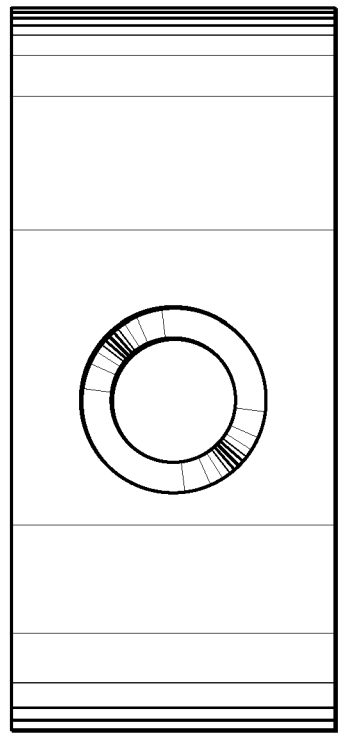
FIG. 1B is a front view illustrating the cutting insert in FIG. 1A.
Figure 1C:
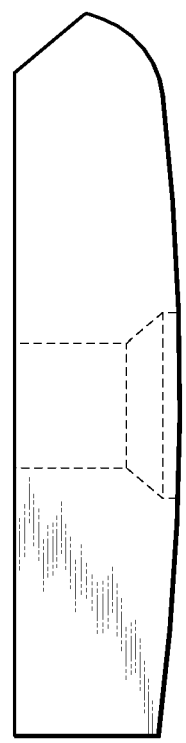
FIG. 1C is a side view illustrating the cutting insert in FIG. 1A.
Figure 2:
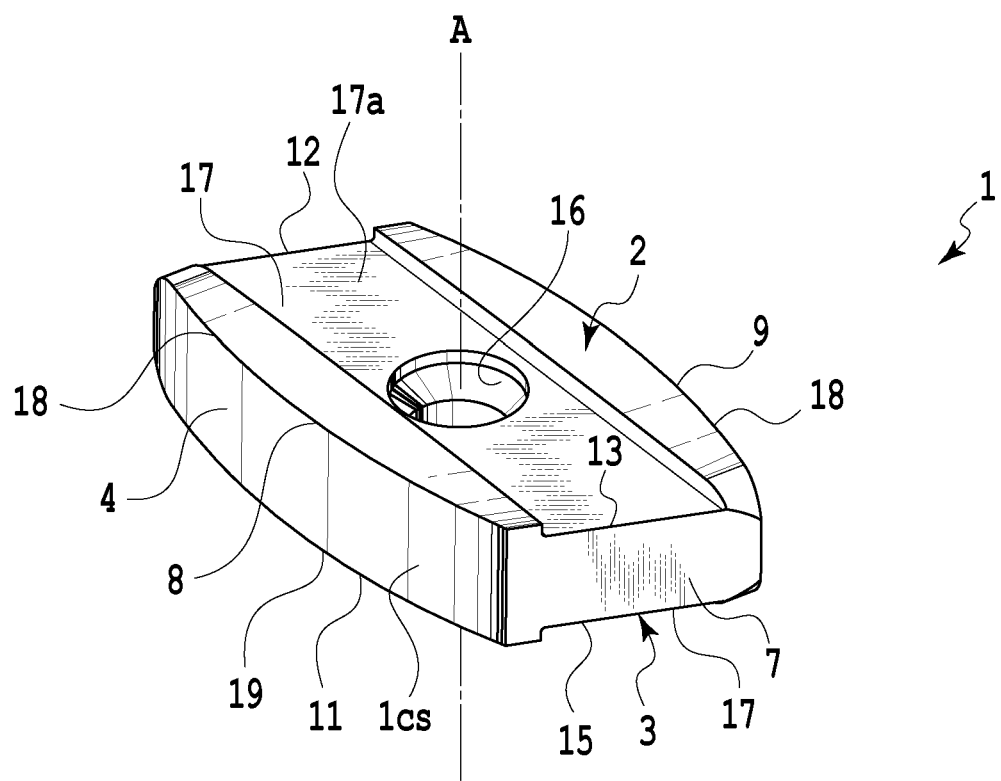
FIG. 2 is a perspective view illustrating a cutting insert according to an embodiment of the present invention.

A cutting insert 1 according to an embodiment of the present invention will be described with reference to FIG. 2 to FIG. 5B. As illustrated in FIG. 2, the cutting insert 1 includes two opposing end surfaces (first and second end surfaces) 2 and 3, and a peripheral side surface 1cs extending therebetween. In the following description, for the purpose of facilitating explanation, the end surface 2, which faces upward in FIG. 2, is referred to as an upper surface, and the end surface 3, which faces downward in FIG. 2, is referred to as a lower surface. Furthermore, in the following description, the terms "upper" and "lower" can be used according to these upper and lower surfaces. However, it is not intended that using these terms "upper" and "lower" is interpreted as limitation of the present invention.

The cutting insert 1 has a flat plate shape, which is basically configured with an upper surface 2 having a substantially parallelogram shape, a lower surface 3 disposed so as to be opposite to the upper surface 2, and four side surface portions 4, 5, 6, and 7 forming a peripheral side surface 1cs that connects the upper surface 2 with the lower surface 3. However, the upper and lower surfaces 2 and 3 each have two opposing side portions with a curved shape when viewed from the end surface (FIG. 3A and FIG. 3F), and hence, do not have a parallelogram shape in a strict sense. Here, the curved side portions are each regarded as a single side portion, and are assumed to be substantially parallel to each other although these side portions are not straight lines and thus are not parallel to each other in a strict sense.

The upper surface 2 and the lower surface 3 include two long side portions 8 and 9, and 10 and 11, and two short side portions 12 and 13, and 14 and 15, respectively. Thus, the intersecting ridgeline portion between the upper surface 2 or the lower surface 3 and the peripheral side surface including four side surface portions 4, 5, 6, and 7 includes a pair of relatively longer intersecting ridgeline portions which are opposite to each other (corresponding to the long side portions 8 and 9 of the upper surface and the long side portions 10 and 11 of the lower surface), and a pair of relatively shorter intersecting ridgeline portions which are opposite to each other (corresponding to the short side portions 12 and 13 of the upper surface and the short side portions 14 and 15 of the lower surface). Furthermore, the four side surface portions 4, 5, 6, and 7, which connect the upper surface 2 and the lower surface 3, include two side surface portions (long-side surface portions) 4 and 5 having the relatively longer intersecting ridgeline portions 8, 9, 10, and 11 at the edge portions thereof, and two side surface portions (short-side surface portions) 6 and 7 having the relatively shorter intersecting ridgeline portions 12, 13, 14, and 15 at the edge portions thereof. Here, the lower surface 3 is formed into a shape corresponding to the shape of the upper surface 2, more specifically, is symmetrical to the upper surface 2 with respect to a plane. Furthermore, the two long-side surface portions 4 and 5 intersect the upper surface 2 and the lower surface 3 substantially at right angles. In addition, a mounting hole (through-hole) 16 having an opening in each of the upper surface 2 and the lower surface 3 substantially at the center portion thereof and extending so as to penetrate the upper surface 2 and the lower surface 3 is provided to the cutting insert 1.

Figure 3A:
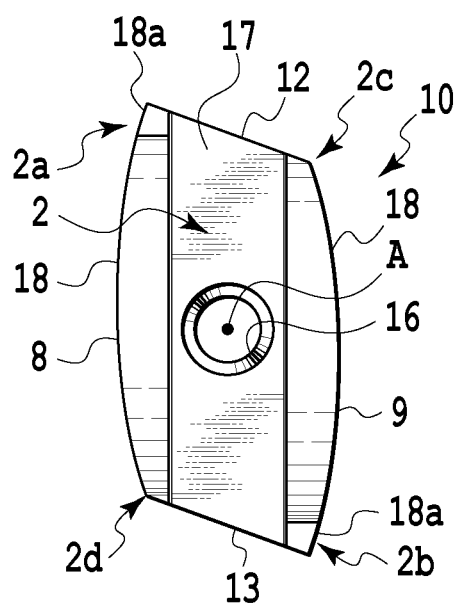
FIG. 3A is a front view illustrating the cutting insert in FIG. 2.
Figure 3B:
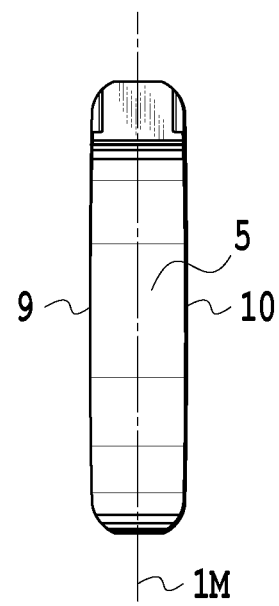
FIG. 3B is a right-side view illustrating the cutting insert in FIG. 2.
Figure 3C:
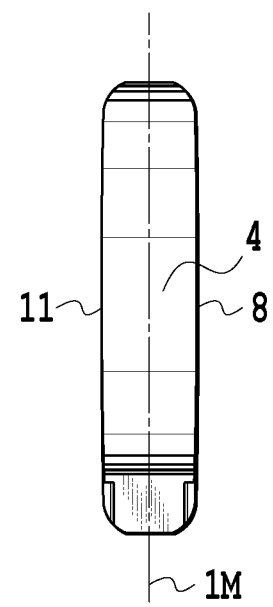
FIG. 3C is a left-side view illustrating the cutting insert in FIG. 2.
Figure 3D:
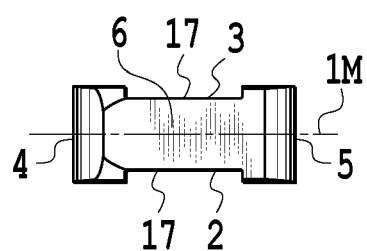
FIG. 3D is a plan view illustrating the cutting insert in FIG. 2.
Figure 3E:
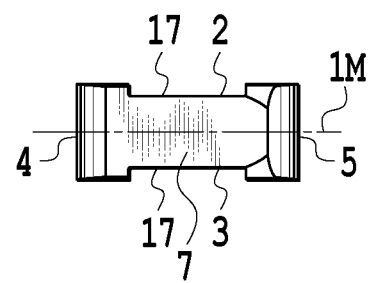
FIG. 3E is a bottom view illustrating the cutting insert in FIG. 2.
Figure 3F:
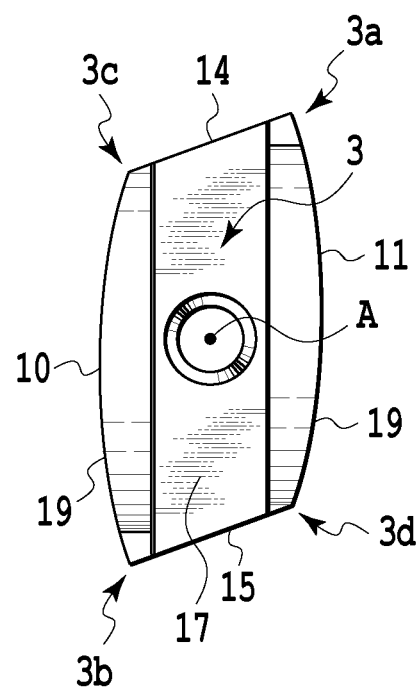
FIG. 3F is a back view illustrating the cutting insert in FIG. 2.

The upper surface 2 is formed so as to be a 180° rotation symmetry around the axis A of the mounting hole 16. As described above, the upper surface 2 has a substantially parallelogram shape, and has four corner portions. When viewed from the end surface on the upper surface 2 side (FIG. 3A), two first upper corner portions 2a and 2b each have an acute angle and two second upper corner portions 2c and 2d each have an obtuse angle, each of which is arranged alternately around the axis A. Similarly, the lower surface 3 is formed so as to be a 180° rotation symmetry around the axis A of the mounting hole 16, and is symmetrical to the upper surface 2 with respect to an insert median plane (first median plane) 1M, which is defined so as to be perpendicular to the axis A and penetrate the peripheral side surfaces of the cutting insert 1. The lower surface 3 has a substantially parallelogram shape, and has four corner portions, as with the upper surface 2. When viewed from the end surface on the lower surface 3 side (FIG. 3F), two first lower corner portions 3a and 3b each have an acute angle and two second upper corner portions 3c and 3d each have an obtuse angle, each of which is arranged alternately around the axis A. The angles of the acute corner portions 2a, 2b, 3a, and 3b of the cutting insert 1 and the angles of the obtuse corner portions 2c, 2d, 3c, and 3d, when viewed from a plate-like surface, in other words, when viewed from the end surface, may be set as appropriate by taking, for example, types of work materials or cutting conditions into consideration. Note that the view from the end surface in FIG. 3A is a diagram when the cutting insert 1 is viewed from a side that faces the upper surface 2 serving as an end surface, and the axis A is represented as a point in FIG. 3A. Furthermore, the view from the end surface in FIG. 3F is a diagram when the cutting insert 1 is viewed from a side that faces the lower surface 3, and the axis A is represented as a point in FIG. 3F.

The relatively longer intersecting ridgeline portions 8, 9, 10, and 11 are each configured so as to function as a cutting edge. The long-side surface portions 4 and 5, which relate to these intersecting ridgeline portions 8, 9, 10, and 11, are each configured so as to be able to function as a rake face. The short-side surface portions 6 and 7, which relate to the relatively shorter intersecting ridgeline portions 12, 13, 14, and 15, are each configured so as to be able to function as a flank. The upper surface 2 and the lower surface 3 are configured so as to function as a flank or the insert seating surface depending on the operable cutting edge. The lower surface 3 can serve as the insert seating surface when the upper surface 2 functions as the flank, and the upper surface 2 can serve as the insert seating surface when the lower surface 3 functions as the flank 2. Furthermore, the acute corner portions 2a, 2b, 3a, and 3b are each configured so as to be able to function as a cutting corner. Since the lower surface 3 is plane symmetrical to the upper surface 2, the cutting edges (upper cutting edges) 18 formed along the relatively longer intersecting ridgeline portions 8 and 9 on the upper surface side is plane symmetrical to the cutting edges (lower cutting edges) 19 formed along the relatively longer intersecting ridgeline portions 10 and 11 on the lower surface side. Note that the upper cutting edge 18 may be called a first cutting edge, and the lower cutting edge 19 may be called a second cutting edge. In this case, the upper surface may correspond to the first end surface, and the lower surface may correspond to the second end surface. These names may have an opposite relationship.

Furthermore, in the cutting insert 1 according to this embodiment, a band-shaped recessed portion 17 having a constant width is formed on the upper surface 2 and the lower surface 3 as illustrated in FIG. 2, and FIG. 3A to FIG. 3F. This recessed portion 17 is formed in the longitudinal direction of the upper surface 2 or the lower surface 3 (so as to extend in the middle between the relatively longer intersecting ridgeline portions on the respective end surfaces), and has a bottom portion 17a formed into a flat plane. In the cutting insert 1 according to this embodiment, the recessed portion 17 has a band shape extending along the longitudinal direction of the cutting insert 1, and is opened to the short-side surface portions 6 and 7. However, the shape of the recessed portion 17 is not limited to this. For example, the recessed portion 17 may have the bottom portion formed into a shape other than the flat plane. In this case, it is preferable that the bottom portion of the recessed portion 17 has a shape mutually complementary to a portion corresponding to an insert mounting seat, which will be described later. Furthermore, the recessed portion 17 may be configured such that it does not have a band shape, and does not extend so as to reach each of the short-side surface portions. In addition, the recessed portion 17 may have a circular shape or polygonal shape such as a quadrilateral shape. The number of the recessed portions 17 is not limited to one for each of the end surfaces.

In this embodiment, each of the relatively longer intersecting ridgeline portions 8, 9, 10, and 11 is formed into a convex shape toward the outside of the insert and into one arc shape when the cutting insert 1 is viewed from the end surface thereof. Here, each of the intersecting ridgeline portions 8, 9, 10, and 11 is formed so as to wholly have one arc shape when the cutting insert 1 is viewed from the end surface. Thus, of the four side surface portions connecting the upper surface 2 and the lower surface 3, two long-side surface portions 4 and 5 each basically have a curved surface shape that follows the convexly curved shape of these intersecting ridgeline portions 8, 9, 10, and 11.

Furthermore, in this embodiment, in the side view of the cutting insert 1 from the long-side surface portion thereof (see FIG. 3B or FIG. 3C), the relatively longer intersecting ridgeline portions 8, 9, 10, and 11 each have a convex shape toward the outside of the insert (in a direction parallel to the axis A), and a large part of the relatively longer intersecting ridgeline portions 8, 9, 10, and 11, excluding the acute corner portions and the vicinity thereof, is formed into one arc shape. More specifically, each of the intersecting ridgeline portions 8 and 9 between the upper surface 2 and the long-side surface portions 4 and 5 is formed into a convex shape toward the upper surface 2 side, and a large part of each of the intersecting ridgeline portions 8 and 9 is formed into an arch shape. Similarly, each of the intersecting ridgeline portions 10 and 11 between the lower surface 3 and the long-side surface portions 4 and 5 is formed into a convex shape toward the lower surface 3 side, and a large part of each of the intersecting ridgeline portions 10 and 11 is formed into an arc shape. Thus, the upper surface 2 and the lower surface 3 each basically have a curved surface shape that follows the convexly curved shape of the relatively longer intersecting ridgeline portions 8, 9, 10, and 11. However, in FIG. 3B and FIG. 3C, there is a possibility that the curved shape of each of the relatively longer intersecting ridgeline portions cannot be clearly observed. This is because the degree of curve is significantly small. Note that the side surface view of FIG. 3B or FIG. 3C is a diagram illustrating the cutting insert 1 when viewed from a side facing the side surface portion, and the insert median plane 1M is represented as a line in FIG. 3B or FIG. 3C.

As described above, in the cutting insert 1, the relatively longer intersecting ridgeline portions 8, 9, 10, and 11 each formed as a cutting edge are each formed into a specific curved shape when the cutting insert is viewed from the side surface and also from the end surface. In particular, the relatively longer intersecting ridgeline portions 8, 9, 10, and 11 each have a substantially arc shape, and are formed so as to follow a first curved shape having one first curvature radius when viewed from the end surface, and follow a second curved shape (different from the first curved shape) having a second curvature radius (different from the first curvature radius) when viewed from the side surface. In particular, in the cutting insert 1 according to the first embodiment, the relatively longer intersecting ridgeline portions 8, 9, 10, and 11 are each formed so as to wholly take on the first curved shape having one first curvature radius when viewed from the end surface, and formed so that a large part of each of the relatively longer intersecting ridgeline portions 8, 9, 10, and 11 (mainly excluding portions along the acute corner portions 2a, 2b, 3a, and 3b) takes on the second curved shape having one second curvature radius when viewed from the side surface.

The curved shape of each of the relatively longer intersecting ridgeline portions 8, 9, 10, and 11 as described above, in other words, the shape of each of the cutting edges 18 and 19 will be further described with reference to FIG. 4 and FIGS. 5A and 5B. The paired upper cutting edges 18 are rotation symmetries to each other around the axis A, and hence, have the same shape. Furthermore, the paired lower cutting edges 19 are also rotation symmetries to each other around the axis A, and hence, have the same shape. In addition, the upper cutting edge and the lower cutting edge are plane symmetries to each other with respect to the insert median plane 1M. Thus, in the following description, only one upper cutting edge 18, which relates to the relatively longer intersecting ridgeline portion 8, will be described as a representative cutting edge.

Figure 4:
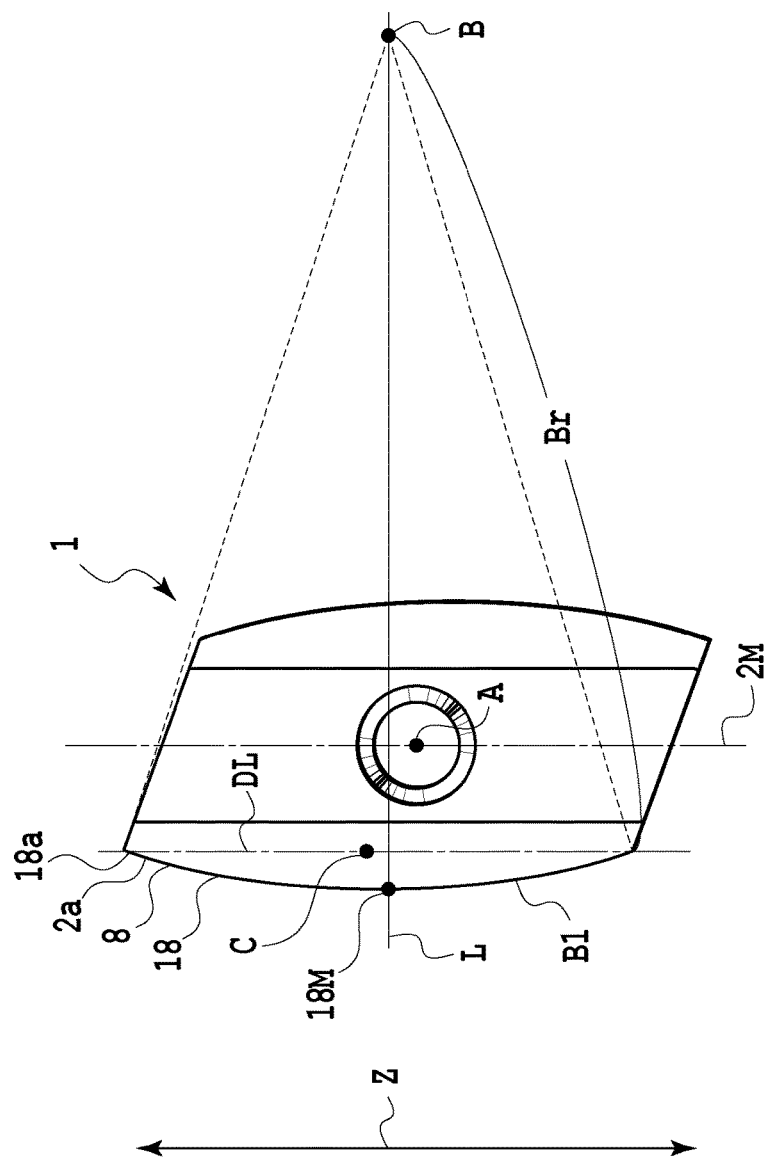
FIG. 4 is a diagram corresponding to FIG. 3A, and is a diagram for explaining the shape of a cutting edge of the cutting insert in FIG. 2.
Figure 5A:
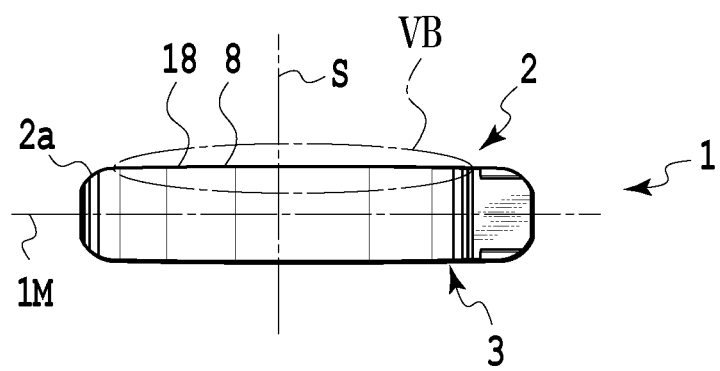
FIG. 5A is a diagram corresponding to FIG. 3C, and is a diagram for explaining the shape of the cutting edge of the cutting insert in FIG. 2.

FIG. 4 is a diagram illustrating an end surface of the cutting insert, and corresponds to FIG. 3A. FIG. 5A is a side view illustrating the cutting insert 1, and corresponds to FIG. 3C, and FIG. 5B is an enlarged schematic view illustrating the curved shape of the cutting edge portion in an area surrounded by the circle VB in FIG. 5A in an exaggerated form. The shape of the upper cutting edge 18 extending along the relatively longer intersecting ridgeline portion 8 on the upper surface 2 side will be described with reference to FIG. 4 to FIG. 5B.

In FIG. 4, on the assumption that the upper cutting edge 18 forms one arc, it is possible to set the center of a circle partially having this arc. More specifically, in FIG. 4, an arc B1 of a circle, which has a radius Br with a point B being set as a center thereof, overlaps with the intersecting ridgeline portion 8, namely, the upper cutting edge 18. In particular, in FIG. 4, a portion 18a of the upper cutting edge 18 along the first acute upper corner portion 2a also extends on the arc B1.

Figure 5B:
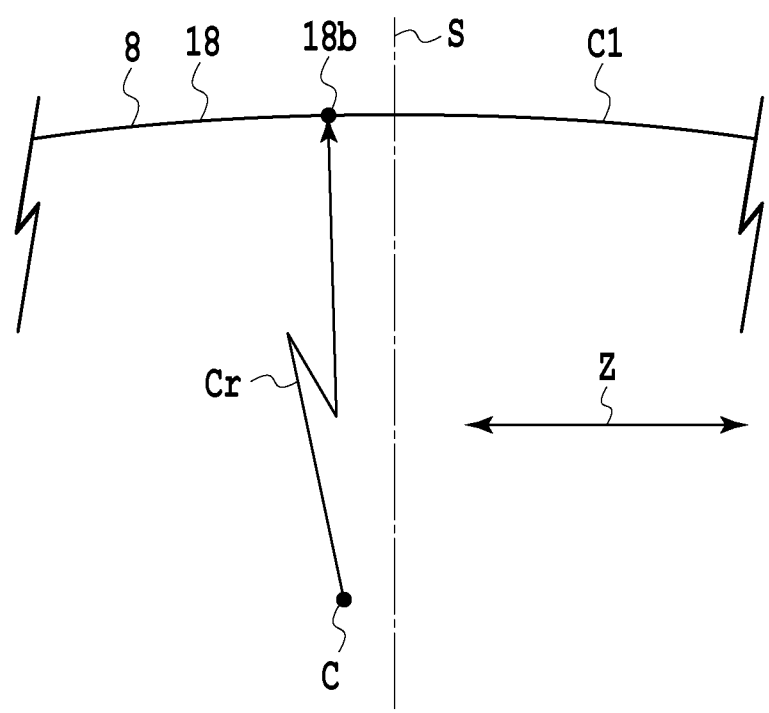
FIG. 5B is an enlarged schematic view illustrating the shape of the cutting edge in an area surrounded by a circle VB in FIG. 5A in an exaggerated form.

On the other hand, if it is assumed that a portion of the upper cutting edge 18 is an arc, it is possible to set the center of a circle partially having this arc in FIG. 5B. In other words, in FIGS. 5A and 5B, an arc C1 of a circle, having a radius Cr with a point C being the center thereof, overlaps with the intersecting ridgeline portion 8, namely, the upper cutting edge 18. However, as can be understood from FIG. 5A and FIG. 5B, the portion 18a of the upper cutting edge 18 along the first acute upper corner portion 2a does not extend on the arc C1. Note that the radius Br in FIG. 4 differs from the radius Cr in FIGS. 5A and 5B. Here, the radius Br is extremely shorter than the radius Cr. As described above, the upper cutting edge 18 is configured to have a specific curved shape both when viewed from the end surface and when viewed from the side surface.

Furthermore, in the cutting insert 1, the center B of the circle partially having the arc B1 in FIG. 4 has a predetermined relationship with the center C of the circle partially having the arc C1 in FIG. 5B. In FIG. 4, in order to explain the relationship between the center B and the center C, the center C of the circle in FIG. 5B is indicated, although there is no specific meaning in a direction perpendicular to the longitudinal direction Z in FIG. 4. Furthermore, in FIG. 4, a point bisecting the upper cutting edge 18 (a point on the upper cutting edge 18 and at equal distances from both end portions of the upper cutting edge 18 in FIG. 4) is indicated as a point 18M, and a straight line L passing through this point 18M and the center B of the circle is indicated. This straight line L corresponds to a plane S extending in parallel to the axis A in FIGS. 5A and 5B. Note that, here, the longitudinal direction Z can be set as a direction parallel to a line DL connecting both end portions of the upper cutting edge 18 when the cutting insert is viewed from the end surface in FIG. 4, and further, can be set as a direction perpendicular to the axis A.

As can be understood from FIG. 4 (and FIG. 5B), the center C of the circle is not located on the straight line L (plane S), and is located apart from the straight line L. The positional relationship between the center B and the center C as described above is designed according to a relationship in distance between the radius (radius of curvature) Br and the radius (radius of curvature) Cr as well as a desired involute-curve shape. Thus, the degree of distance from the plane S to the center C (distance) is set according to a selected involute-curve shape.

Here, when a plane (second median plane) 2M containing the axis A and extending in parallel to the longitudinal direction Z is defined, the upper cutting edge 18 is located farthest from the plane 2M at the point 18M on the line L in FIG. 4, and approaches to the plane 2M with an increasing distance from the point 18M. The plane 2M is perpendicular to the insert median plane 1M and bisects the cutting insert 1. Furthermore, the upper cutting edge 18 is curved so as to most protrude toward the upper surface 2 side (so as to be located farthest from the insert median plane 1M) at a point 18b located apart from the plane S corresponding to the line L in FIG. 5B.

It should be noted that, as described above, in the cutting insert 1, each of the cutting edges is formed into a shape that follows an arc (curved shape having one radius of curvature) of a single circle when viewed from the end surface, and is formed so that a large part of each of the cutting edges is formed into a shape that follows an arc (curved shape having another radius of curvature) of another circle when viewed from the side surface, thereby being formed so as to be curved in a three-dimensional manner. However, each of the cutting edges may be formed so that only over half each of the cutting edges follow an arc of a single circle when the cutting insert 1 is viewed from the side surface thereof. Furthermore, when the cutting insert 1 is viewed from the end surface thereof, each of the cutting edges may be formed so that only over half each of the cutting edges follow an arc of a single circle. However, preferably a large part of, more preferably the whole of the cutting edges may be formed so as to follow an arc of a single circle when viewed from the end surface thereof. Furthermore, each of the cutting edges 18 and 19, in other words, each of the intersecting ridgeline portions 8, 9, 10, and 11 is formed so that at least over half, preferably a large part of, more preferably the whole of the intersecting ridgeline portions 8, 9, 10, and 11 have a smoothly, three-dimensionally curved shape. However, each of the cutting edges 18 and 19 may be wholly or partially formed so as to have a curved shape in an approximate manner by seamlessly lining up plural straight line portions, in particular, relatively shorter straight line portions.

Figure 6:
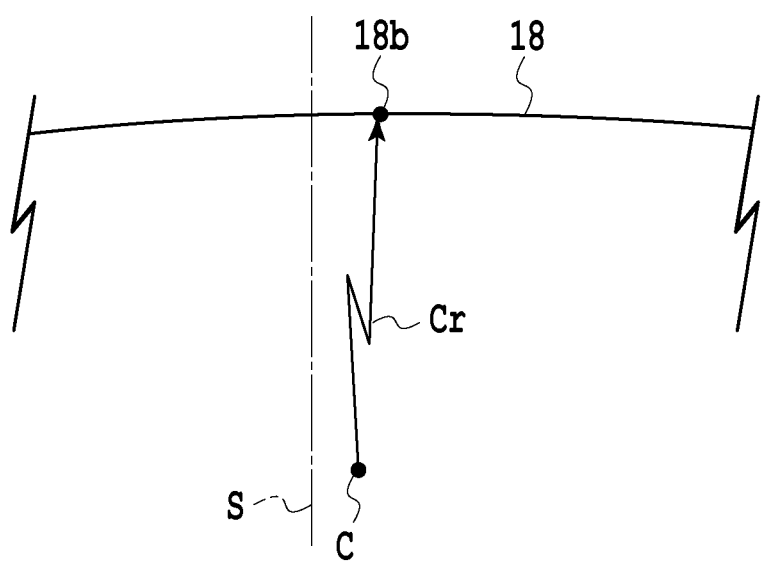
FIG. 6 is an enlarged schematic view of a cutting edge portion in a side view of a cutting insert according to another embodiment different from the cutting insert in FIG. 2.

In the cutting insert 1, on the assumption that each of the cutting edges has an arc shape when the cutting insert 1 is viewed from the side surface, the center of a circle partially having this arc is located in an area on the side of the first acute corner portion of the cutting edge from among two areas separated by the plane S. However, there is a possibility that the center C of a circle when viewed from the side surface is located in an area on the other side of the plane S depending on a selected involute-curve shape. FIG. 6 is an enlarged schematically view illustrating a curved shape of the cutting edge portion in an exaggerated manner in a side view of a cutting insert according to another embodiment different from the cutting insert 1, and is a diagram illustrating a portion corresponding to an area surrounded by a circle VB in FIG. 5A. In FIG. 6, when a large part of the upper cutting edge 18 is regarded as an arc, the center C of a circle partially having this arc is illustrated on the right side of the plane S. Thus, in the cutting insert illustrated in FIG. 6, when a large part of the cutting edge is regarded as an arc, the center C of a circle partially having this arc is not located in an area on the side of the first acute corner portion of the cutting edge, and is located on the other area from among two areas separated by the plane S when the cutting insert is viewed from the side surface thereof. In addition, in the cutting insert illustrated in FIG. 6, a portion 18b of the upper cutting edge 18, which is located farthest from the insert median plane 1M, is located in an area where the center C is located with respect to the plane S, as with the cutting edge 18 of the cutting insert 1. However, it may be possible to employ a configuration in which the center C is located in one area of the two areas separated by the plane S, and the portion 18b of the cutting edge, which is located farthest from the insert median plane 1M, is located in the other area.

Figure 7A:
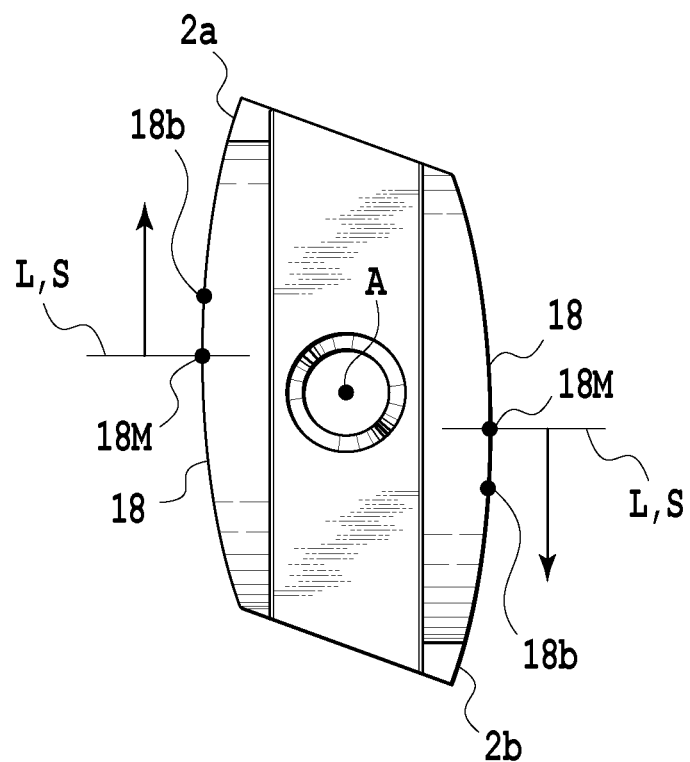
FIG. 7A is a schematic view for explaining the shape of a cutting edge of a cutting insert according to an embodiment of the present invention.
Figure 7B:
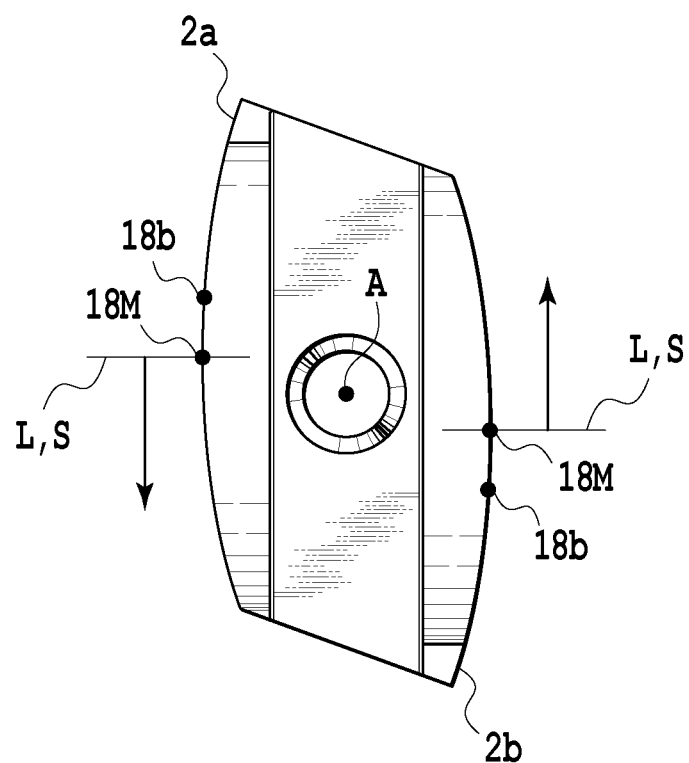
FIG. 7B is a schematic view for explaining the shape of a cutting edge of a cutting insert according to an embodiment of the present invention.
Figure 8A:
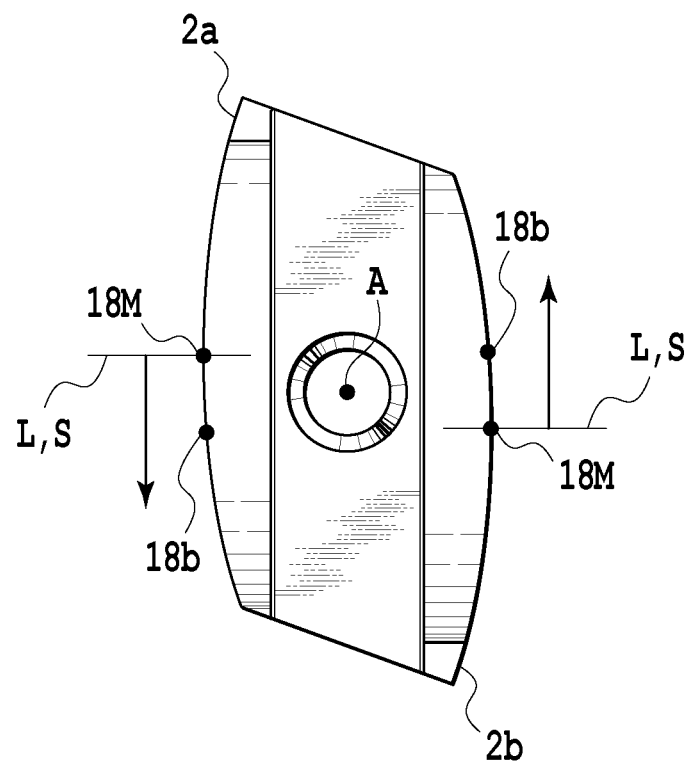
FIG. 8A is a schematic view for explaining the shape of a cutting edge of a cutting insert according to an embodiment of the present invention.
Figure 8B:
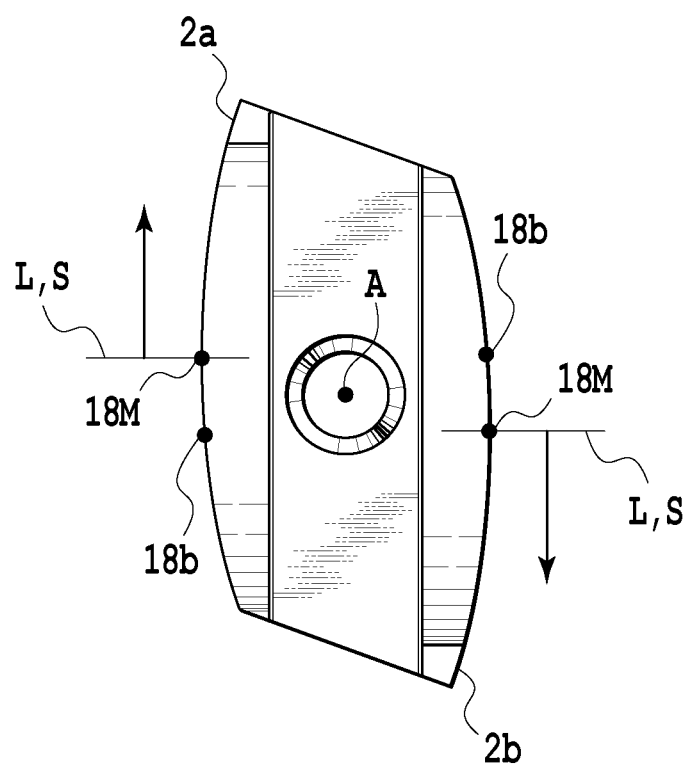
FIG. 8B is a schematic view for explaining the shape of a cutting edge of a cutting insert according to an embodiment of the present invention.
Figure 9:
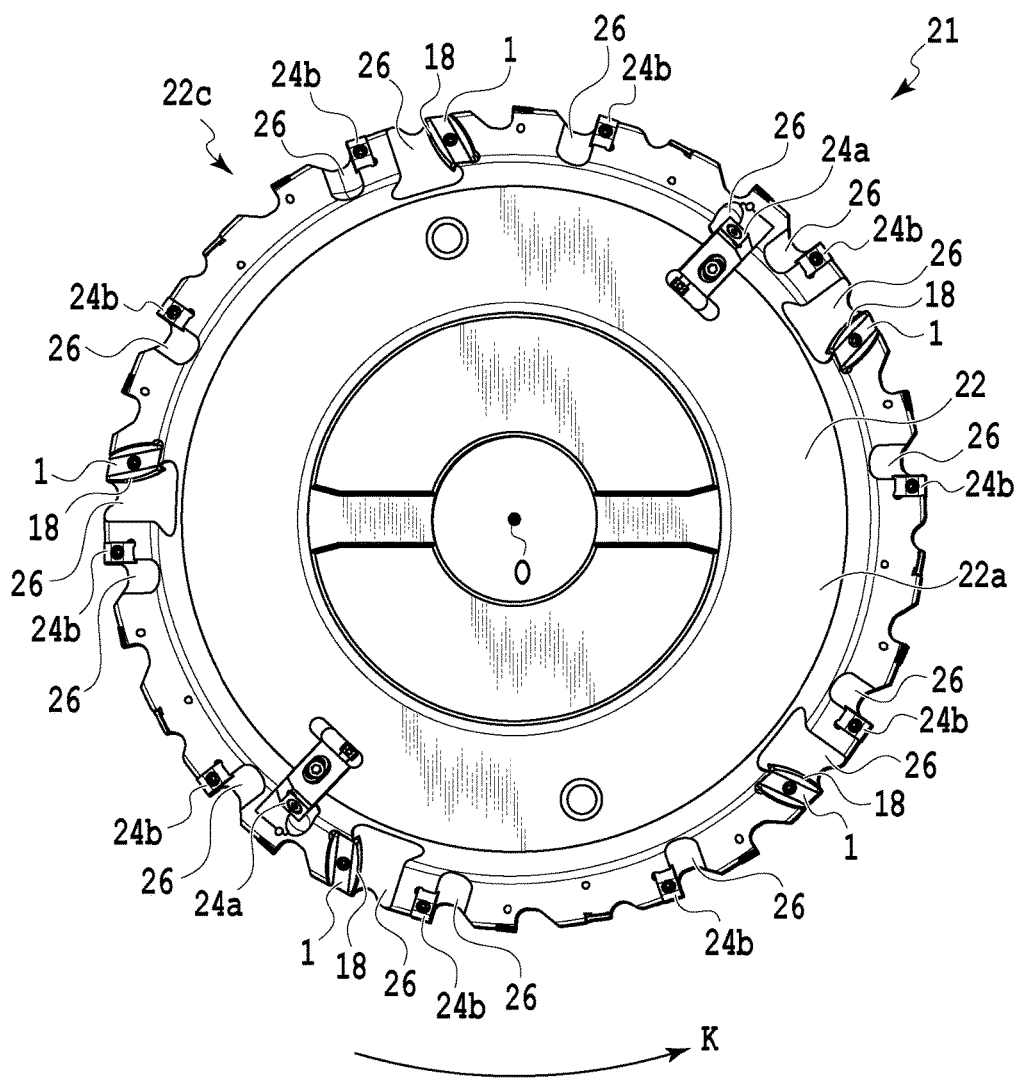
FIG. 9 is a front view illustrating an indexable rotary cutting tool according to an embodiment of the present invention.
Figure 10:
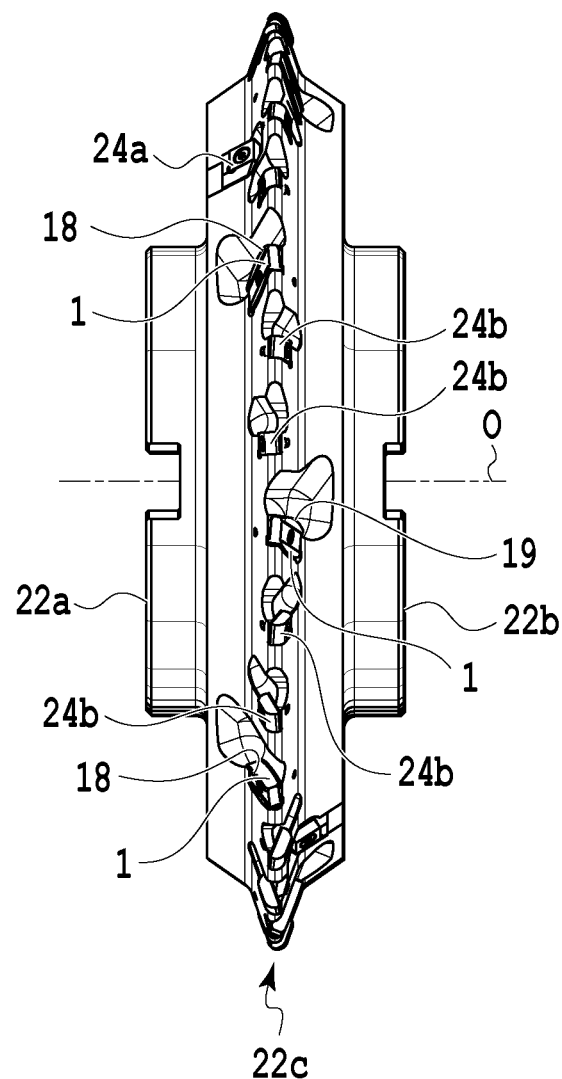
FIG. 10 is a side view illustrating a cutting tool in FIG. 9.

FIG. 7A and FIG. 7B each schematically illustrate a cutting insert in which the portion 18b located farthest from the insert median plane 1M is located in an area on the side of the first acute corner portion 2a, 2b with respect to the straight line L, in other words, the plane S. In each of the drawings, the arrow schematically indicates an area where the center C of a circle can be positioned when the cutting insert is viewed from the side surface. FIG. 7A illustrates that the center C of a circle is located in an area on the side of the first acute corner portion 2a, 2b. FIG. 7B illustrates that the center C of a circle is located in an area on the other side, which is different from the area on the side of the first acute corner portion 2a, 2b. FIG. 8A and FIG. 8B each schematically illustrate a cutting insert in which the portion 18b located farthest from the insert median plane 1M is located in an area different from the area on the side of the first acute corner portion 2a, 2b with respect to the straight line L, in other words, the plane S. In each of the drawings, the arrow schematically indicates an area where the center C of a circle can be positioned when the cutting insert is viewed from the side surface. FIG. 8A illustrates that the center C of a circle is located in an area different from the area on the side of the first acute corner portion 2a, 2b. FIG. 8B illustrates that the center C of a circle is located in an area on the side of the first acute corner portion 2a, 2b. The present invention permits plural positional relationships between the portion 18b of the cutting edge 18 located farthest from the insert median plane 1M and the center C of a circle set when the cutting insert is viewed from the side surface thereof as illustrated in FIG. 7A to FIG. 8B. It is preferable that these positional relationships are selected according to a selected involute-curve shape.

Furthermore, as for the shape of the cutting edge, in the cutting insert 1, the cutting edge is located farthest from the plane 2M at the portion 18M on the straight line L in FIG. 4 when the cutting insert 1 is viewed from the end surface thereof. However, it may be possible to form the cutting edge so as to be located farthest from the plane 2M at a position different from the point 18M. In this case, the portion located farthest from the plane 2M may be located on any side with respect to the straight line L, in other words, the plane S. Furthermore, the present invention permits the cutting edge of the cutting insert to be formed such that the farthest portion from the plane 2M in the cutting edge is matched with the farthest portion from the insert median plane 1M in the same cutting edge.

In the cutting insert 1 according to this embodiment, the long-side surface portion 4, 5, which connects the long side portion of the upper surface 2 and the long side portion of the lower surface 3, intersect the upper surface 2 and the lower surface 3 in a direction substantially perpendicular to them. However, the shape of the long-side surface portion 4, 5 is not limited to this. For example, each of the long-side surface portions 4, 5 may have a shape recessed toward the inside of the cutting insert 1, or on the contrary, may have a shape protruding externally. In other words, the shape of the side surface portion 4 may be changed as appropriate, provided that the long side portion 8 of the upper surface 2 formed into a curved shape and the corresponding long side portion 11 of the lower surface 3 formed into a curved shape are located on an imaginary curved plane defined substantially at a right angle with respect to the upper surface 2 (in other words, in parallel to the axis A) along the long side portion 8 of the upper surface 2 formed into a curved shape. This also applies to the side surface portion 5. The long side portions 8, 9, 10, and 11, each formed into a curved shape, of the upper surface 2 and the lower surface 3 have the positional relationships as described above, and hence, with the cutting insert 1 according to this embodiment, it is possible to use both cutting edges of the upper and lower surfaces 2 and 3 for cutting operations. However, the present invention does not exclude a so-called positive-type cutting insert in which the side surface portion 4, 5 crosses the upper surface 2 or the lower surface 3 at an acute angle or an obtuse angle. In this case, the cutting edge is formed in relation to either the upper surface 2 or the lower surface 3.

In this embodiment, as described above, the outer shape of the cutting insert 1 basically has a substantially parallelogram shape when viewed from a plate-like surface, and only the long side portions 8, 9, 10, and 11 of the cutting insert 1 each are formed to have a specific curved shape. However, side portions formed so as to have such a curved shape are not limited to this. More specifically, unlike the cutting insert 1, the short side portions 12, 13, 14, and 15 may be formed so as to have a curved shape in a manner similar to the long side portion or the cutting edge described above. Furthermore, the ratio in length of the long side portion 8, 9, 10, 11 relative to the short side portion 12, 13, 14, 15 can be changed as appropriate. In addition, the outer shape of the cutting insert 1 is not limited to the substantially parallelogram. It may be possible to employ a substantially rectangular shape, or a substantially square shape.

Furthermore, it may be possible to form a chip breaker on the long-side surface portion 4, 5 configured so as to function as a rake face, with the aim of improving chip treatability. The shape of the chip breaker may be determined as appropriate by considering various factors such as types of work material to be cut and material types of the cutting insert. Furthermore, in order to improve strength in the cutting edge, it may be possible to form honing or land on the cutting edge. The shape of honing or land may be determined as appropriate by considering various factors such as types of work material to be cut and material types of the cutting insert.

The cutting insert 1 according to this embodiment may be made of a hard material such as a cemented carbide, cermet, ceramic, and an ultrahigh-pressure sintered body containing diamond or cubic boron nitride, or a hard material obtained by subjecting these materials to coating.

Next, an indexable rotary cutting tool 21 in which the cutting insert 1 described above is detachably mounted will be described with reference to FIG. 9 to FIG. 14.

The indexable rotary cutting tool 21 is a cutter for a gear cutting, in which the cutting insert 1 is detachably mounted. A tool body 22 has a substantially disk shape, which is basically configured with two side end surfaces 22a and 22b having a substantially circular shape, and an outer peripheral portion 22c that connects both the side end surfaces 22a and 22b. The rotary cutting tool 21 rotates around the rotational axis O extending so as to penetrate the two side end surfaces 22a and 22b, and is fed, thereby being used for cutting work.

On both side end surfaces, insert mounting seats 23 (23a, 23b) for mounting the cutting inserts 1 are arranged alternately in a staggered manner on both the side end surfaces along the outer peripheral edge portion of the tool body 22 in the circumferential direction with the rotational axis O being the center. Furthermore, insert mounting seats 25 (25a, 25b, 25c, 25d) for mounting general cutting inserts 24a, 24b, other than the cutting insert 1, having a substantially rectangular plate shape are provided in a similar manner. In addition, a chip pocket 26 is disposed on the forward side of each of the insert mounting seats 23, 25 in the tool rotational direction K. The cutting insert 1 according to the embodiment described above and other cutting inserts 24a, 24b are arranged and screwed in a tangential location on each of the insert mounting seats 23, 25 of the rotary cutting tool 21 having the form as described above.

The rotary cutting tool 21 according to this embodiment is the type to carry out a gear cutting by combining plural types of cutting inserts. With this type of rotary cutting tool 21, the gear cutting machining is performed by using a cutting insert for machining the vicinity of the base end portion (root portion) of a tooth of the gear shape to be machined, a cutting insert for machining the vicinity of the central portion of the tooth, and a cutting insert for machining the vicinity of the top portion of the tooth. The cutting insert 1 according to the embodiment described above is used to machine the vicinity of the central portion of the tooth. This cutting insert 1 is mounted to the tool body 22 so that the acute corner portion thereof when the cutting insert is viewed from the end surface can be involved in cutting. More specifically, for example, when the cutting insert 1 is placed on the tool body 22 so that the upper surface 2 serves as a flank and the lower surface 3 serves as a seating surface, the long side surface that is not related to the operable upper cutting edge 18 of the cutting insert 1 is brought into contact with a side wall surface that faces forward in the tool rotational direction of the mounting seat in the outer peripheral portion side of the tool body 22, and the acute corner portion of the operable upper cutting edge 18 of the cutting insert 1 is located in an open space on the chip pocket 26 side. Note that, unlike the rotary cutting tool 21 according to this embodiment, it may be possible to employ a tool configuration in which the entire tooth from the base end portion to the top portion is formed only with the cutting insert according to the present invention (cutting insert configured on the basis of the inventive concept similar to the cutting insert 1). In this case, only the cutting inserts according to the present invention are mounted in a staggered manner on the outer peripheral portion of the tool body in the circumferential direction of the tool body.

Figure 11:
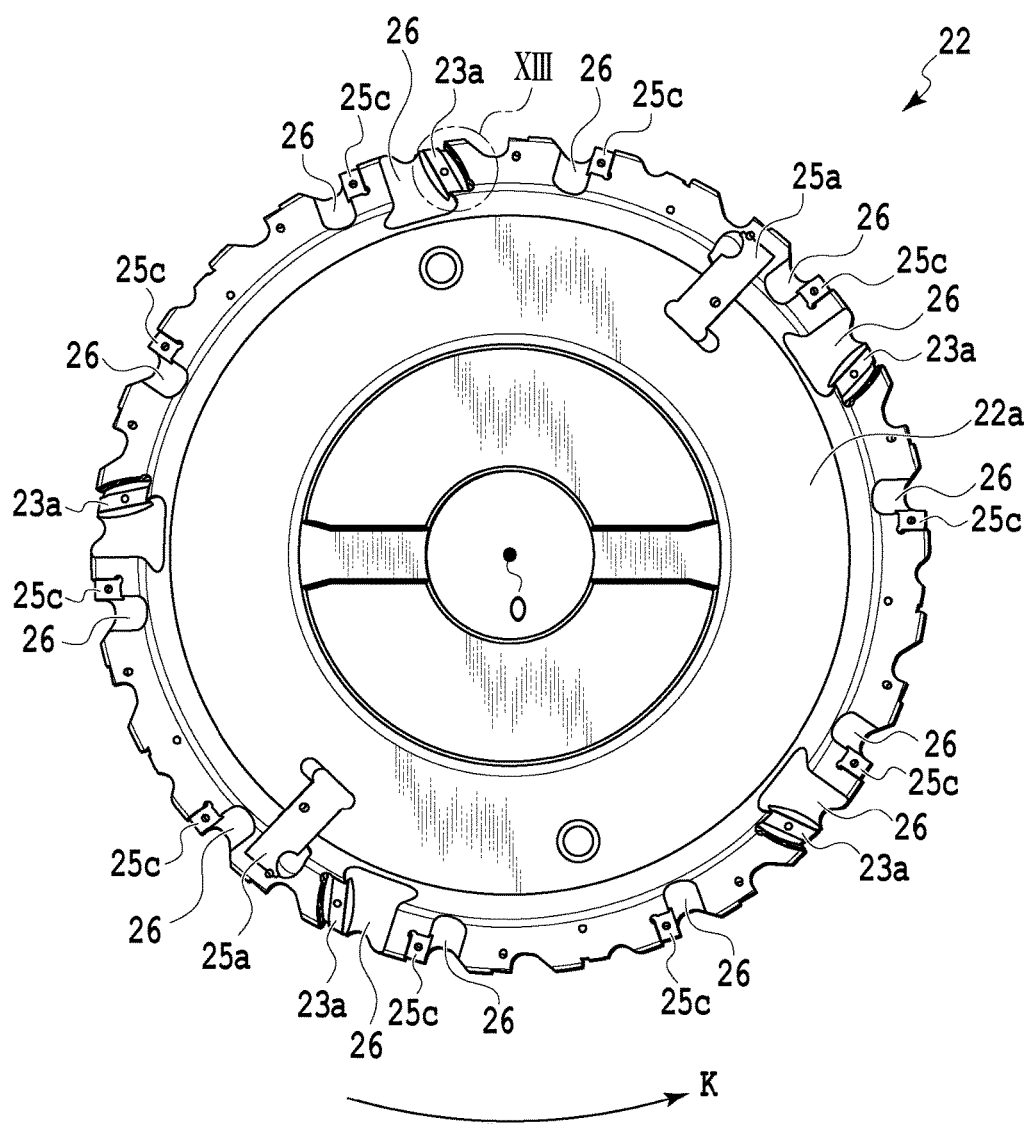
FIG. 11 is a front view illustrating a tool body of the cutting tool in FIG. 9.
Figure 12:
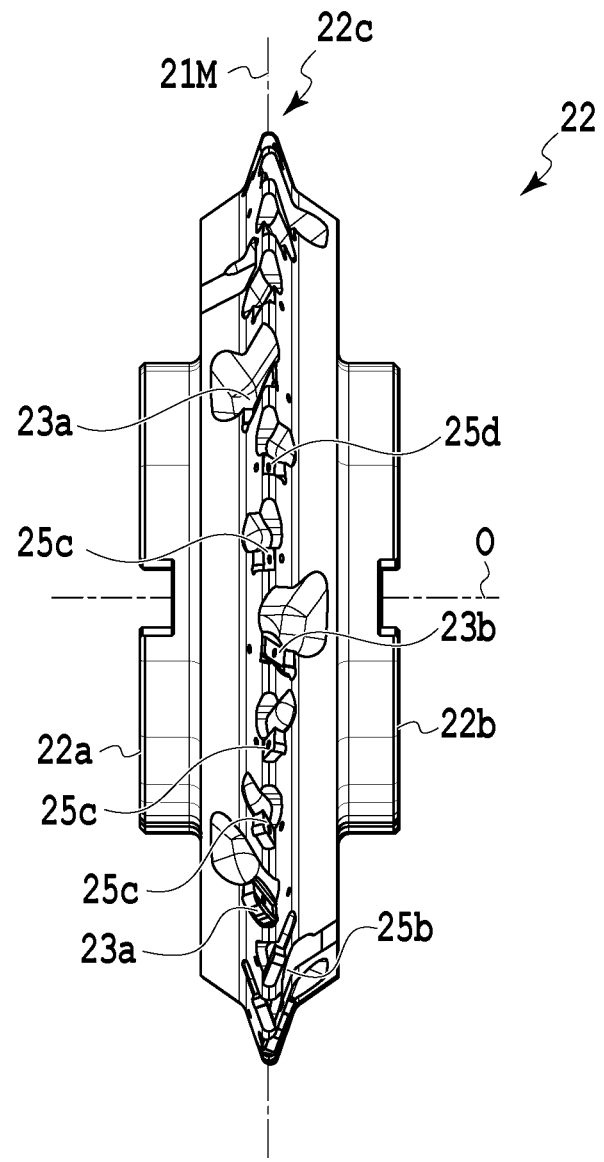
FIG. 12 is a side view illustrating the tool body in FIG. 11.
Figure 13:
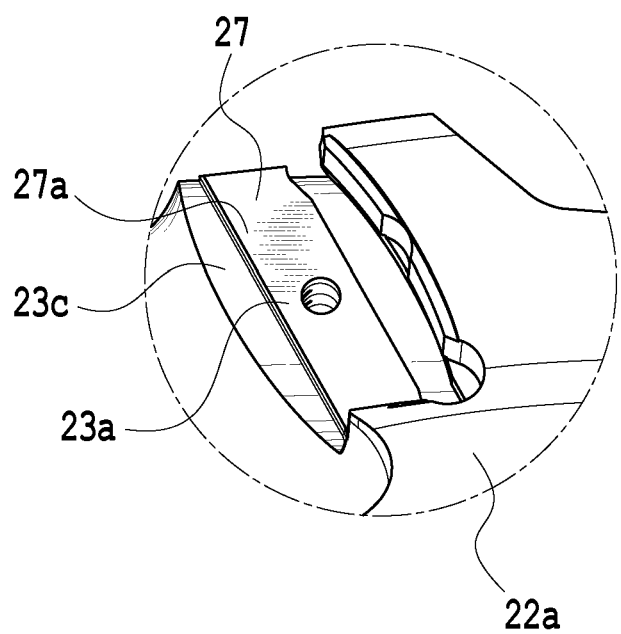
FIG. 13 is a partially enlarged view illustrating a circle VIII in FIG. 11.

In the rotary cutting tool 21 according to this embodiment, a raised portion 27 is formed on the seating surface (bottom wall surface) of the first insert mounting seat 23*a* on the side of the first side end surface 22*a* as illustrated in FIG. 13, which is an enlarged view of the circle portion XIII in FIG. 11. This raised portion 27 is formed with a constant width along the longitudinal direction of the insert mounting seat 23*a* (along the substantially radial direction with the rotational axis O of the tool 21 being the center), and the top portion 27*a* thereof is formed into a flat plane. The raised portion 27 of the insert mounting seat 23*a* is shaped so as to be able to be inserted into the recessed portion 17 formed on the lower surface 3 of the cutting insert 1, and is configured so that the top portion 27*a* of the raised portion 27 can be brought into contact with the bottom portion 17*a* of the recessed portion 17. The cutting insert 1 is mounted on the insert mounting seat 23*a* in a manner such that the flat bottom portion of the recessed portion 17 and the flat top portion of the raised portion 27 abut against each other. Similarly, the second insert mounting seat 23*b* on the second side end surface 22*b* side is provided with a raised portion that is associated with the recessed portion 17 of the upper surface 2 of the cutting insert 1.

The first insert mounting seat 23*a* is configured so that the cutting insert 1 can be mounted thereon in a manner such that the upper cutting edge 18 can be used. The second insert mounting seat 23*b*, which is the other mounting seat, is configured so that the cutting insert 1 can be mounted thereon in a manner such that the lower cutting edge 19 can be used.

In the case where the lower surface 3 of the cutting insert 1 is used as the seating surface (upper cutting edge 18 is used), the lower surface 3 is brought into contact with the seating surface of the insert mounting seat 23*a*. On the other hand, in the case where the upper surface 2 of the cutting insert 1 is used as a seating surface (lower cutting edge 19 is used), the upper surface 2 is brought into contact with the seating surface of the insert mounting seat 23*b*. Furthermore, any two of the side surface portions 4, 5, 6, and 7 of the cutting insert 1 are brought into contact with two side wall surfaces (surfaces extending upright from the seating surface) of the insert mounting seat 23. At this time, the cutting edge formed on any of the intersecting ridgeline portions 8, 9, 10, and 11 functions as a cutting edge having an involute-curve approximate shape. Thus, in the cutting insert 1 according to this embodiment, it is possible to use, for cutting work, a total of four cutting edges, which are two cutting edges 18 of the upper surface 2 and two cutting edges 19 of the lower surface 3, and the cutting insert 1 is indexable.

The seating surface of the insert mounting seat 23 is sloped with respect to the tool rotational direction K. This sloping of the first insert mounting seat 23*a* will be described with reference to FIG. 14. The second insert mounting seat 23*b* has a shape symmetrical to the first insert mounting seat 23*a* with respect to a plane, and hence, explanation thereof will be omitted.

Figure 14:
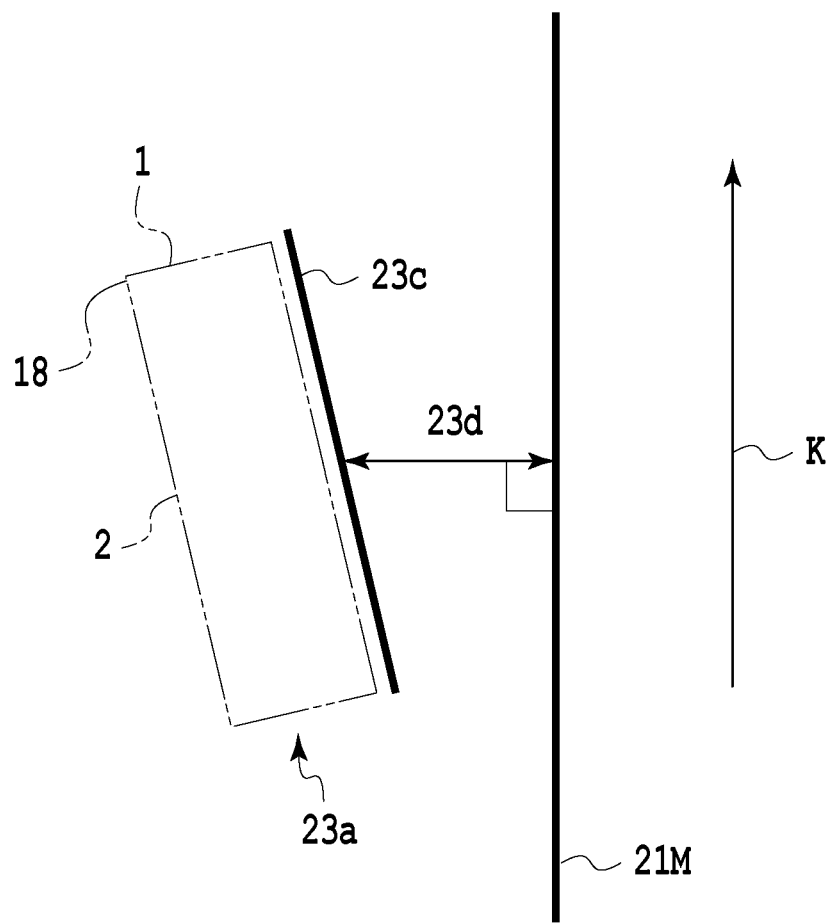
FIG. 14 is a schematic view for explaining a state where a cutting insert is mounted on the cutting tool in FIG. 9.

FIG. 14 schematically illustrates a tool median plane 21M that bisects the cutting tool 21, namely, the tool body 22. Note that the tool median plane 21M is a plane that is perpendicular to the rotational axis O of the cutting tool 21, and is defined so as to equally divide the tool body 22 of the cutting tool 21 into one side end surface 22*a* side and the other side end surface 22*b* side. In FIG. 14, the seating surface (bottom wall surface) 23*c* of the insert mounting seat 23*a* is schematically illustrated.

As can be clearly understood from FIG. 14, the seating surface 23*c* of the insert mounting seat 23*a* is sloped with respect to the tool median plane 21M, and the distance 23*d* from the median plane 21M in a direction parallel to the rotational axis O increases toward the front side in the tool rotational direction K. In other words, the insert mounting seat 23*a* is formed so as to be sloped with respect to the tool median plane 21M in a manner such that the distance 23*d* from the tool median plane 21M of the tool body 22 to the seating surface 23*c* of the insert mounting seat 23*a* gradually increases toward the tool rotational direction K side. Thus, when the cutting insert 1 is mounted on the insert mounting seat 23*a* so that the lower surface 3 serves as a seating surface, the upper surface 2 of the cutting insert 1 is not in substantial parallel to the side end surface 22*a* of the tool body 22, and the cutting insert 1 is disposed in a sloped manner in a state where the operable cutting edge 18 side (in other words, the long side portion side adjacent to the chip pocket 26), which is to be involved in cutting work, stands from the side wall surface 22*a* of the tool body 22. With this configuration, an appropriate relief is provided to the cutting insert 1. Note that the shape of the cutting edge of the cutting insert 1 is designed by considering the mounting angle in slope in the cutting insert 1.

Next, operation and effect obtained by the cutting insert 1 and the indexable rotary cutting tool 21 described above will be described.

In the cutting insert 1 according to this embodiment, the relatively longer intersecting ridgeline portions 8, 9, 10, and 11 designed so as to function as a cutting edge are each formed into one convexly curved shape having a constant radius of curvature which is curved convexly toward the outside of the insert when viewed from the end surface, and are each formed into one convexly curved shape having a constant radius of curvature which is curved convexly toward the outside of the insert (in other words, toward the upper surface 2 side or the lower surface 3 side) when viewed from the side surface. With this configuration, it is possible to significantly improve the degree of similarity of the shape of the cutting edge to an involute curve without causing a large cost. Below, the operation and effect will be described in detail using an example of experiments.

In the experiments, evaluation was made as to the shape of a cutting edge 18E of a cutting insert (example of the present invention) 1E configured on the basis of the inventive concept same as the cutting edges 18 and 19 of the cutting insert 1 described above. As for a comparative example, evaluation was made as to the shape of a cutting edge 31E of a cutting insert (first comparative example) 31 having a cutting edge curved only when the cutting insert is viewed from the side surface. Furthermore, evaluation was made as to the shape of a cutting edge 32E of a cutting insert (second comparative example) 32 having a cutting edge curved only when the cutting insert is viewed from the end surface. In the experiments, evaluation was made by comparing the degrees of similarity of the shapes of cutting edges to an involute curve in the case where the cutting edges 18E, 31E, and 32E of the cutting inserts 1E, 31, and 32 are designed so as to be made close to the same involute curve as much as possible.

Figure 15:
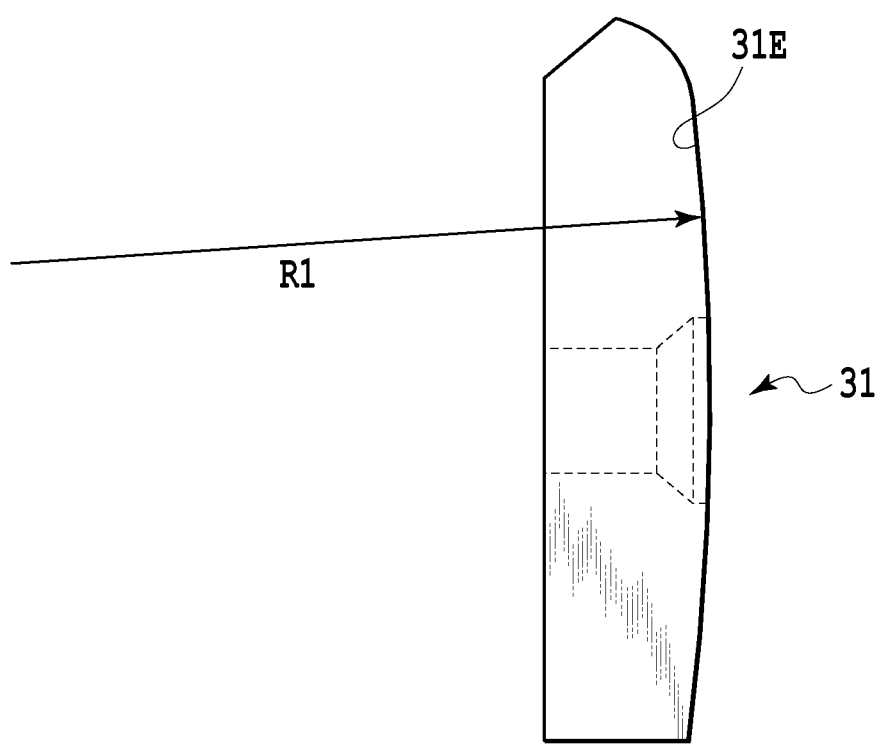
FIG. 15 is a diagram for explaining a cutting insert according to a first comparative example.

It should be noted that, with the cutting insert 31 according to the first comparative example, the cutting edge 31E was formed into a convexly curved shape having a single radius R1 of curvature only when the cutting insert 31 is viewed from the side surface (see FIG. 15). Furthermore, with the cutting insert 32 according to the second comparative example, the cutting edge 32E was formed into a convexly curved shape having a single radius R2 of curvature only when the cutting insert 32 is viewed from the end surface (see FIG. 16). On the other hand, with the cutting insert 1E according to an example of the present invention, the cutting edge 18E had a convexly curved shape having a single radius of curvature both when viewed from the side surface and when viewed from the end surface as described in relation to the cutting insert 1.

In the experiments, the degree of similarity of the cutting edge to an involute curve was calculated by obtaining theoretical errors between the shape of a cutting edge of each of the cutting inserts and an involute curve at the time when a gear having a module of 10, a pressure angle of 20°, and the number of teeth of 70 was made.

Figure 17:
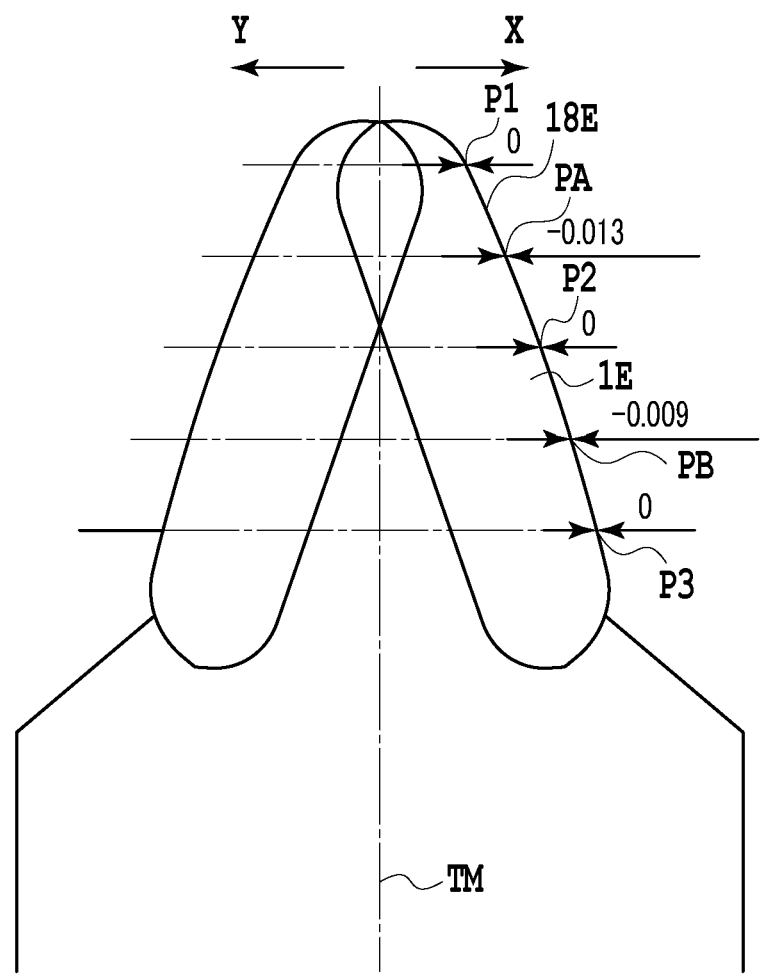
FIG. 17 is a schematic view illustrating evaluation results of a cutting insert according to an example of the present invention.
Figure 18:
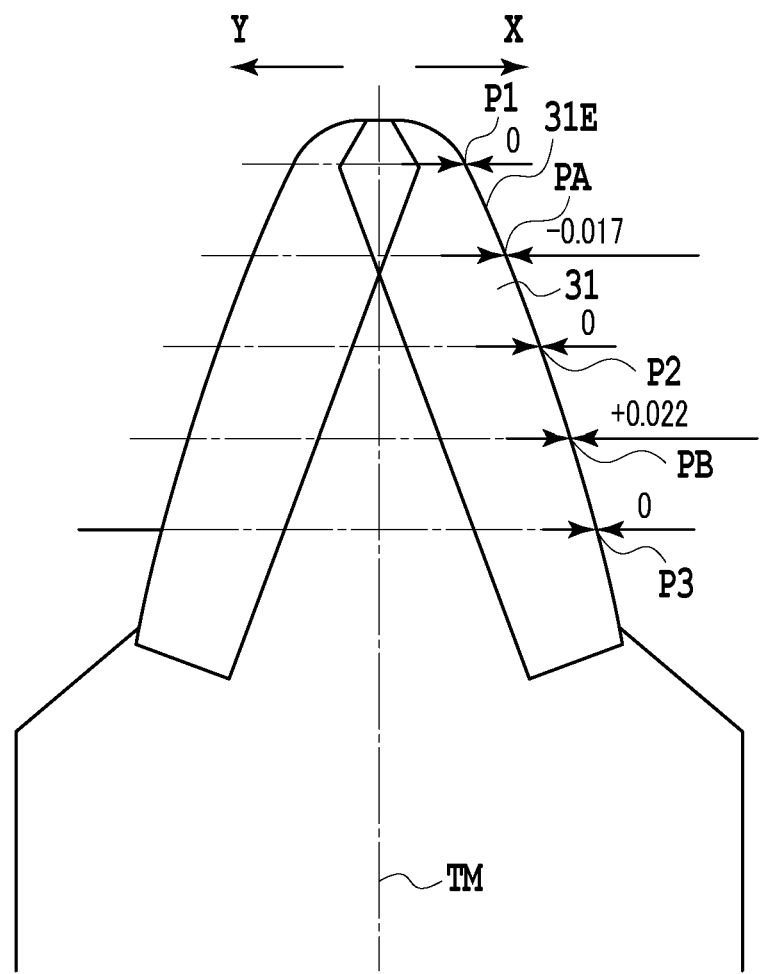
FIG. 18 is a schematic view illustrating evaluation results of the cutting insert according to the first comparative example.
Figure 19:
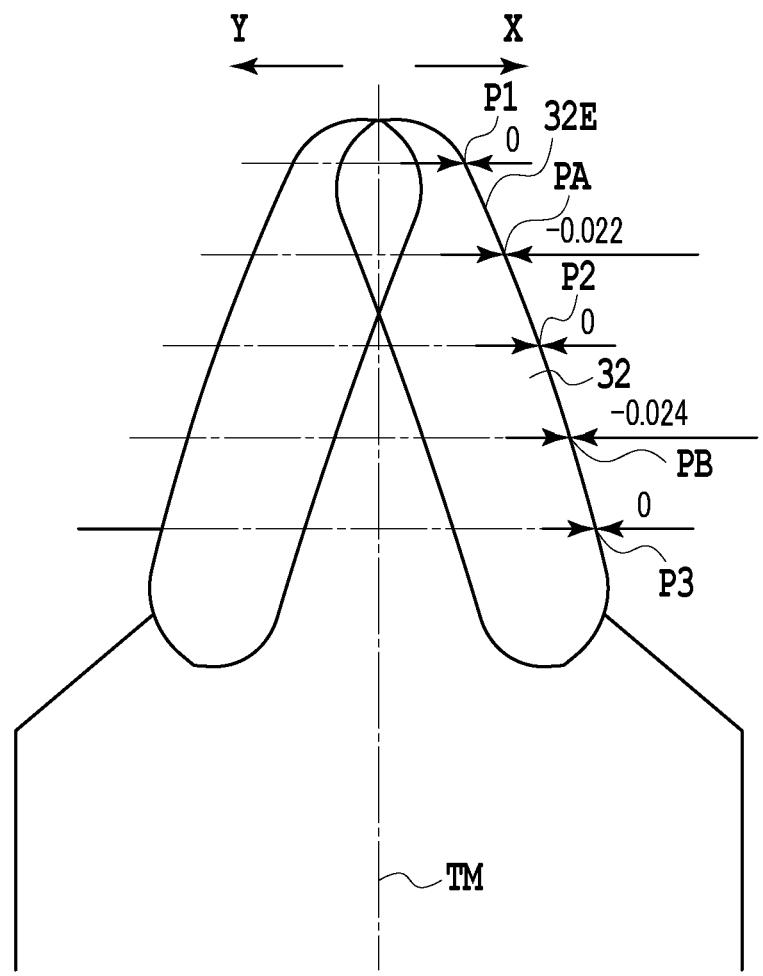
FIG. 19 is a schematic view illustrating evaluation results of the cutting insert according to the second comparative example.
Figure 20:
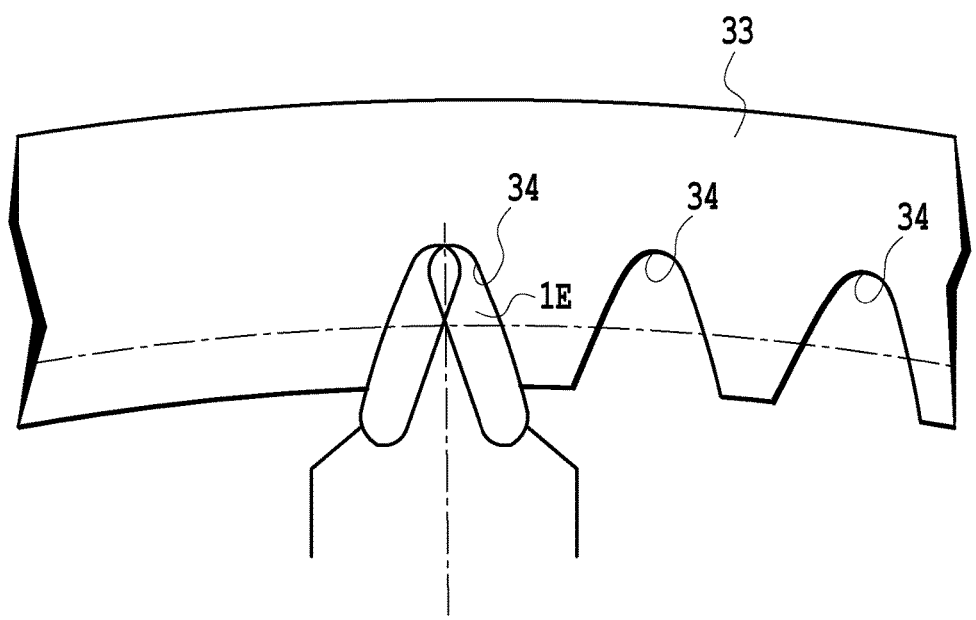
FIG. 20 is a schematic view illustrating a state where tooth spaces are machined with a rotary cutting tool.

FIG. 17 to FIG. 19 are schematic views each partially illustrating an indexable rotary cutting tool that mounts the cutting insert 1E, 31, 32 described above. Note that FIG. 17 to FIG. 19 illustrate two cutting inserts in a state of facing each other and partially overlapping with each other. However, in reality, these cutting inserts are arranged so as to be positionally shifted externally in the circumferential direction of the tool body at predetermined intervals, as with the cutting tool 21 described above. However, these cutting inserts 1E, 31, and 32 are configured so as to be able to be used as illustrated in FIG. 20. FIG. 20 schematically illustrates an example of a state where the rotary cutting tool having the cutting insert 1E mounted thereon is fed toward a work material 33 while being made to rotate around the central axis of the rotary cutting tool having the cutting insert 1E mounted thereon, whereby tooth spaces 34 of an internal gear are machined one by one. As illustrated in FIG. 20, the shape (cross sectional shape in the radial direction of the rotational path) of a cutting edge of the cutting insert 1 is transferred straightly to the work material, whereby teeth of the gear are formed.

Each of the cutting edges 18E, 31E, and 32E of the respective cutting inserts 1E, 31, and 32 is set so as to coincide with an involute curve at three points P1, P2, and P3 sequentially arranged from the top end side in FIG. 17 to FIG. 19. In other words, at the three points P1, P2, and P3, the error between the shape of a cutting edge of each of the cutting inserts and the involute curve becomes zero in all the cutting inserts. With these settings, the shape of the cutting edge of each of the cutting inserts becomes the closest to an involute curve in any mode.

Furthermore, in this state, theoretical errors between a cutting edge and an involute curve at a point PA, which is located at the midpoint between the point P1 and the point P2, and a point PB, which is located at the midpoint between the point P2 and the point P3, were obtained for each of the cutting inserts, and these theoretical errors were compared. It is obvious that, as the theoretical error decreases, the degree of similarity to the involute curve increases. Below, the results are shown in FIG. 17 to FIG. 19, and are collectively shown in Table 1.

Figure 16:
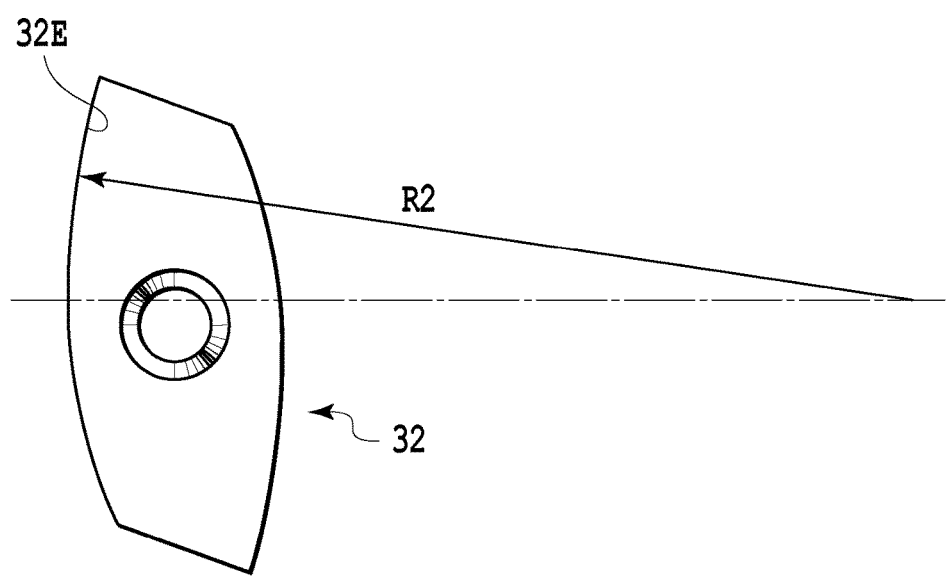
FIG. 16 is a diagram for explaining a cutting insert according to a second comparative example.

At this time, the radius R1 of curvature (see FIG. 15 illustrating a side surface view) of the cutting edge of the cutting insert 31 according to the first comparative example was 122 mm. Furthermore, the radius R2 of curvature (see FIG. 16 illustrating an end surface view) of the cutting edge of the cutting insert 32 according to the second comparative example was 17 mm. Furthermore, the radius of curvature (corresponding to the radius Cr described above) of the cutting edge of the cutting insert 1E according to the example of the present invention when viewed from the side surface was 662 mm, and the radius of curvature (corresponding to the radius Br described above) when viewed from the end surface was 20 mm. Furthermore, as for the plus or minus sign for errors in the table, minus indicates the X side (right side in the drawing) in a direction perpendicular to the tool median plane TM in FIG. 17 to FIG. 19, and plus indicates the Y side (left side in the drawing). In addition, the maximum error in Table 1 indicates the maximum numerical difference in values, which were compared at five points P1, P2, P3, PA, and PB.

TABLE 1

|  | First comparative example | Second comparative example | Example of present invention |
|---|---|---|---|
| Error to involute curve at P1, P2, P3 | 0 | 0 | 0 |
| Error (mm) to involute curve at point PA | −0.017 | −0.022 | −0.013 |
| Error (mm) to involute curve at point PB | +0.022 | −0.024 | −0.009 |
| Maximum error (mm) | 0.039 | 0.024 | 0.013 |

As shown in Table 1, it is found that the cutting insert 1E according to the example of the present invention has significantly small theoretical errors to an involute curve, as compared with the cutting inserts 31 and 32 according to the first and second comparative examples. More specifically, it is found that the cutting insert 1E according to the example of the present invention achieves an improvement in theoretical errors by approximately 70% relative to the cutting insert 31 according to the first comparative example and by approximately 45% relative to the cutting insert 32 according to the second comparative example in terms of the maximum error. As described above, as a result of earnest study made by the present inventors, it is found that, rather than the cutting edge formed into a convexly curved shape having a single radius of curvature either when viewed from the side surface or when viewed from the end surface, the cutting edge of a cutting insert obtained by combining them can significantly improve the degree of similarity to an involute curve. Thus, according to the cutting insert 1E of the example of the present invention, it is possible to achieve an effect of significantly improving the degree of similarity to an involute curve without causing a large cost, as compared with the comparative examples.

According to the cutting insert 1 of this embodiment, it is possible to achieve the shape of the cutting edge extremely similar to various types of involute curve required for forming a work material into a teeth shape by variously changing combinations of the radius of curvature of the cutting edge when viewed from the end surface and the radius of curvature of the cutting edge when viewed from the side surface. Thus, it is preferable that the first curvature radius of the cutting edge when viewed from the end surface and the second curvature radius of the cutting edge when viewed from the side surface are different from each other (in the example of the present invention described above, the radii of curvature differ from each other as with the cutting insert 1 described above).

Furthermore, as described with reference to FIG. 4 to FIG. 5B, it is preferable that the center B of a circle, from which an arc is formed when viewed from the end surface, does not coincide in the Z direction in FIG. 4 with the center C of a circle, from which an arc is formed when viewed from the side surface. More specifically, it is preferable that, in the case where the center of a first circle partially having an arc is set on the assumption that the cutting edge is regarded as this arc when the cutting insert is viewed from the end surface thereof, and the center of a second circle partially having an arc is set on the assumption that at least over half the same cutting edge is regarded as this arc when the cutting insert is viewed from the side surface thereof, the center of the second circle is spaced apart from a plane represented as a straight line passing through a point bisecting the cutting edge and the center of the first circle when the cutting insert is viewed from the end surface thereof. As described above, by positionally shifting the centers of the circles when viewed from the end surface and when viewed from the side surface, it is possible to further precisely set a change in the three-dimensional shape of the entire cutting edge according to situations, and it is possible to make the shape of the cutting edge further correctly similar to an involute curve of which shape changes so that the radius of curvature gradually changes. Note that the present invention does not exclude that the center of the second circle exists on a plane represented as a straight line passing through a point bisecting the cutting edge and the center of the first circle when the cutting insert is viewed from the end surface thereof. However, as described above, it is preferable that the center of the second circle is disposed apart from this plane.

Furthermore, it is possible to significantly reduce manufacturing costs of tools by forming, on the upper surface 2 or the lower surface 3 of the cutting insert 1, the recessed portion 17 having the bottom portion with a flat plane, and mounting the cutting insert 1 on the mounting seat 23 in a manner such that this flat plane of the bottom portion of the recessed portion 17 is brought into contact with the flat plane of the top portion of the raised portion 27 of the insert mounting seat 23. As can be clearly understood from the description above, the end surface, the edge portion of which has a cutting edge, is formed into a curved shape in association with the cutting edge being formed into a three-dimensionally curved shape. In general, in the case where the end surface having the curved-surface shape described above is treated as a seating surface, it is desirable that the seating surface of the insert mounting seat also has a shape into which the curved-surface shape is fitted. This is because the degree of stability of the cutting insert on the insert mounting seat is more increased. However, while the cutting insert is generally manufactured through a die, the insert mounting seat is generally manufactured by cutting a material, and hence, significant time and effort are required to form the insert mounting seat into such a shape, which possibly increases manufacturing costs.

However, in the case where the cutting insert 1 and the insert mounting seat 23 are configured as described above, it is possible to securely mount the cutting insert 1 on the insert mounting seat 23 by bringing the flat surfaces of the recessed portion 17 and the raised portion 27 into contact with each other. Thus, when the cutting insert 1 is mounted on the insert mounting seat 23, it is possible to bring portions other than the recessed portion of the end surface of the cutting insert into a non-contacted state with respect to the seating surface of the insert mounting seat 23. This eliminates the need of forming the seating surface of the insert mounting seat 23 into a curved shape that is complementary to the shape of the end surface of the cutting insert, which makes it possible to reduce manufacturing costs. Furthermore, this has a configuration in which the flat surfaces are brought into contact with each other. Thus, even if dimensional errors occur between the end surface of the cutting insert and the seating surface of the insert mounting seat, it is possible to minimize the effect thereof, and it is possible to fix the cutting insert 1 to the insert mounting seat in a highly precise manner. Furthermore, as the radius of curvature of each of the intersecting ridgeline portions 8, 9, 10, and 11 serving as the cutting edges of the cutting insert 1 when viewed from the side surface is changed, the curved shape of the upper surface 2 or the lower surface 3 is also changed accordingly. However, since the flat planes of the recessed portion and the raised portion are brought into contact with each other as described above, it is not necessary to change the shape of the seating surface of the insert mounting seat 23. In other words, since various types of cutting inserts having intersecting ridgeline portions (cutting edges) with various curvature radii can be mounted in the same rotary cutting tool, it is possible to significantly reduce costs required in connection with tools.

Figure 21:
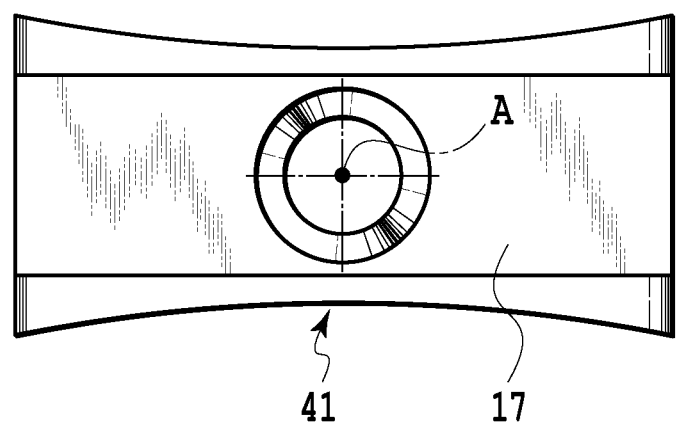
FIG. 21 is a front view illustrating a cutting insert according to another embodiment of the present invention.

These are descriptions of the cutting insert in which each of the intersecting ridgeline portions 8, 9, 10, and 11 serving as the cutting edge have a convexly curved shape to externally protrude when viewed from the end surface and when viewed from the side surface. However, this curved shape may be a concavely curved shape, which is curved toward the inside of the cutting insert. FIG. 21 illustrates a cutting insert 41 as one example of this. In the cutting insert 41 in FIG. 21, the cutting edge is formed so as to have a specific curved shape both when viewed from the side surface and when viewed from the end surface, as with the cutting edge of the cutting insert 1. As described above, by performing cutting with the cutting edge having the concavely curved shape, it is possible to form a tooth that can engage with a tooth formed with the cutting insert 1 according to the embodiment illustrated in FIG. 2 to FIG. 3F. In other words, it is possible to form a tooth having a shape in which projection and depression are opposite to those of a tooth formed with the cutting insert 1, in other words, form a tooth having an involute-curve approximate shape. Furthermore, it may be possible to employ a configuration in which the intersecting ridgeline portions 8, 9, 10, and 11 each serving as a cutting edge each have a convexly curved shape when viewed from the end surface, and have a concavely curved shape when viewed from the side surface, or a configuration in which the intersecting ridgeline portions 8, 9, 10, and 11 each have a concavely curved shape when viewed from the end surface, and have a convexly curved shape when viewed from the side surface. These can be set as appropriate according to a shape of a gear to be machined. Naturally, these cutting inserts, shapes of which are variously changed, can similarly achieve the characteristic effect of the present invention described above.

Descriptions of the typical embodiments according to the present invention was made. However, various modifications are possible to the present invention. In the present invention, replacements and modifications are possible without departing from the spirit and the scope of the present invention defined in claims of this application.

The invention claimed is:

1. A cutting insert having a mounting hole provided with a mounting hole axis (A) around which the insert has 180° rotational symmetry, the cutting insert comprising:
    a first end surface; a second end surface being opposite to the first end surface; and a peripheral side surface extending between the first end surface and the second end surface,
    wherein at least one cutting edge having an arc shape is formed on an intersecting ridgeline portion between the peripheral side surface and at least one of the first end surface and the second end surface,
    wherein the cutting edge is formed so as to follow one first curved shape having a constant first curvature radius when the cutting insert is viewed from the end surface thereof, and is formed so that at least over half the cutting edge follows one second curved shape having a constant second curvature radius when the cutting insert is viewed from the side surface thereof;
    and wherein:
    in an end surface view of the cutting insert along the mounting hole axis (A):
        the cutting edge comprises a first arc (B1) belonging to a first circle having a first center (B) and a first curvature radius (Br), and
        a midpoint (18M) of the cutting edge lies on a first line (L) that bisects the cutting edge and passes through the first center (B); and
    in a side surface view of the cutting insert:
        at least half of the same cutting edge comprises a second arc (C1) belonging to a second circle having a second center (C) and a second curvature radius (Cr); and
        the second center (C) is located apart from a first plane (S) that contains the first line (L) and is parallel to the mounting hole axis (A).

2. A rotary cutting tool having a rotational axis (O) and a tool rotational direction (K) around the rotational axis (O), the rotary cutting tool comprising:
    a disk shaped tool body including two substantially circular side end surfaces and an outer peripheral portion provided between the side end surfaces, a median plane (21M) perpendicular to the rotational axis (O), located between the two circular side end surfaces and bisecting the tool body,
    the tool body having a plurality of insert mounting seats arranged alternately in a staggered manner on both side end surfaces, along an outer peripheral edge portion of the tool body in the circumferential direction around the rotational axis (O), each insert mounting seat having a seating surface, and
    a cutting insert detachably mounted on each of the insert mounting seats, the cutting insert having a mounting hole provided with a mounting hole axis (A) around which the insert has 180° rotational symmetry, the cutting insert comprising:
        a first end surface; a second end surface being opposite to the first end surface; and a peripheral side surface extending between the first end surface and the second end surface,
        wherein at least one cutting edge having an arc shape is formed on an intersecting ridgeline portion between the peripheral side surface and at least one of the first end surface and the second end surface, and
        wherein the cutting edge is formed so as to follow one first curved shape having a constant first curvature radius when the cutting insert is viewed from the end surface thereof, and is formed so that at least over half the cutting edge follows one second curved shape having a constant second curvature radius when the cutting insert is viewed from the side surface thereof, and
    wherein the seating surface of the insert mounting seat is formed in a sloped manner such that, in a direction parallel to the rotational axis (O), a distance from the median plane to the seating surface of the insert mounting seat gradually increases in the tool rotational direction (K).

3. The rotary cutting tool according to claim 2, wherein the cutting edge is formed so as to wholly take on the first curved shape with the first curvature radius when the cutting insert is viewed from the end surface thereof, and is formed so that a large part of the cutting edge takes on the second curved shape with the second curvature radius when the cutting insert is viewed from the side surface thereof.

4. The rotary cutting tool according to claim 2, wherein the first curvature radius differs from the second curvature radius.

5. The rotary cutting tool according to claim 2, wherein:
    in an end surface view of the cutting insert along the mounting hole axis (A):
        the cutting edge comprises a first arc (B1) belonging to a first circle having a first center (B) and a first curvature radius (Br), and
        a midpoint (18M) of the cutting edge lies on a first line (L) that bisects the cutting edge and passes through the first center (B); and
    in a side surface view of the cutting insert:
        at least half of the same cutting edge comprises a second arc (C1) belonging to a second circle having a second center (C) and a second curvature radius (Cr); and
        the second center (C) is located apart from a first plane (S) that contains the first line (L) and is parallel to the mounting hole axis (A).

6. The rotary cutting tool according to claim 2, wherein the cutting edge has a convexly curved shape when the cutting insert is viewed from the end surface thereof, and also has a convexly curved shape when the cutting insert is viewed from the side surface thereof.

7. The rotary cutting tool according to claim 2, wherein a pair of first cutting edges, which are opposite to each other, are each formed as the cutting edge on an intersecting ridgeline portion between the first end surface and the peripheral side surface, a pair of second cutting edges, which are opposite to each other, are each formed on an intersecting ridgeline portion between the second end surface and the peripheral side surface, and the first cutting edge and the second cutting edge are formed so as to be symmetrical with respect to the median plane.

8. The rotary cutting tool according to claim 2, wherein a recessed portion is formed on at least one of the first end surface and the second end surface.

9. The rotary cutting tool according to claim 8, wherein a bottom portion of the recessed portion is a flat plane.

10. The rotary cutting tool according to claim 2, wherein the peripheral side surface is formed substantially at a right angle with respect to the first end surface.

11. The indexable rotary cutting tool according to claim 2, wherein in the cutting insert, a recessed portion is formed on at least one of the first end surface and the second end surface, and wherein a raised portion that can be inserted into the recessed portion of the cutting insert is formed on the seating surface of the insert mounting seat.

12. The indexable rotary cutting tool according to claim 11, wherein, when the cutting insert is mounted on the insert mounting seat, a top portion of the raised portion of the insert mounting seat is brought into contact with a bottom portion of the recessed portion of the cutting insert.

13. The indexable rotary cutting tool according to claim 2, wherein in the cutting insert, a recessed portion is formed on at least one of the first end surface and the second end surface and a bottom portion of the recessed portion is a flat plane, wherein a raised portion that can be inserted into the recessed portion of the cutting insert is formed on the seating surface of the insert mounting seat, and wherein a flat top portion of the raised portion of the insert mounting seat is brought into contact with a flat bottom portion of the recessed portion of the cutting insert when the cutting insert is mounted on the insert mounting seat.

14. A cutting insert comprising:

opposing first and second end surfaces, each having a substantially parallelogram shape and four corner portions;

a peripheral side surface extending between the first end surface and the second end surface, the peripheral side surface comprising a pair of opposing long side surfaces connecting to a pair of opposing short side surfaces;

an insert median plane (1M) passing through the peripheral side surface, and between the first and second end surfaces, the cutting insert having mirror symmetry about the insert median plane;

a mounting hole passing between the first and second end surfaces;

an axis of rotation (A) passing through the mounting hole, the first and second end surfaces having 180° rotational symmetry about the axis of rotation (A);

an intersecting ridgeline portion formed between the pair of long side surfaces and each of the first and second end surfaces; wherein:

a cutting edge is formed on each intersecting ridgeline portion and extends the entire length from one short side surface to another;

when viewed from its associated end surface, each cutting edge follows a first curved shape having a constant first curvature radius for its entire length;

when viewed from its associated long side surface, said each cutting edge follows a second curved shape having a constant second curvature radius for more than one-half of its length but less than its entire length; and the first radius of curvature differs from the second radius of curvature.

15. The cutting insert according to claim 14, wherein:

when viewed from its associated long side surface, a point (18b) of said each cutting edge farthest from the insert median plane is offset from a point (18M) bisecting said each cutting edge.

16. A rotary cutting tool having a rotational axis (O) and a tool rotational direction (K) around the rotational axis (O), the rotary cutting tool comprising:

a disk shaped tool body including two substantially circular side end surfaces and an outer peripheral portion provided between the side end surfaces, a median plane (21M) perpendicular to the rotational axis (O), located between the two circular side end surfaces and bisecting the tool body, the tool body having a plurality of insert mounting seats arranged alternately in a staggered manner on both side end surfaces, along an outer peripheral edge portion of the tool body in the circumferential direction around the rotational axis (O), each insert mounting seat having a seating surface, and a cutting insert detachably mounted on each of the insert mounting seats, the cutting insert having a mounting hole provided with a mounting hole axis (A) around which the insert has 180° rotational symmetry, the cutting insert comprising:

a first end surface; a second end surface being opposite to the first end surface; and a peripheral side surface extending between the first end surface and the second end surface, wherein at least one cutting edge having an arc shape is formed on an intersecting ridgeline portion between the peripheral side surface and at least one of the first end surface and the second end surface, and wherein the cutting edge is formed so as to follow one first curved shape having a constant first curvature radius when the cutting insert is viewed from the end surface thereof, and is formed so that at least over half the cutting edge follows one second curved shape having a constant second curvature radius when the cutting insert is viewed from the side surface thereof, and wherein the cutting inserts are mounted on each side of the median plane (21M) such that, in a direction parallel to the rotational axis (O), a distance from the median plane to an operative cutting edge of each cutting insert gradually increases as the cutting edge approaches the rotational axis (O).

17. The rotary cutting tool according to claim 16, wherein the cutting edge is formed so as to wholly take on the first curved shape with the first curvature radius when the cutting insert is viewed from the end surface thereof, and is formed so that a large part of the cutting edge takes on the second curved shape with the second curvature radius when the cutting insert is viewed from the side surface thereof.

18. The rotary cutting tool according to claim 16, wherein the first curvature radius differs from the second curvature radius.

19. The rotary cutting tool according to claim 16, wherein:
in an end surface view of the cutting insert along the mounting hole axis (A):
- the cutting edge comprises a first arc (B1) belonging to a first circle having a first center (B) and a first curvature radius (Br), and
- a midpoint (18M) of the cutting edge lies on a first line (L) that bisects the cutting edge and passes through the first center (B); and in a side surface view of the cutting insert:
- at least half of the same cutting edge comprises a second arc (C1) belonging to a second circle having a second center (C) and a second curvature radius (Cr); and
- the second center (C) is located apart from a first plane (S) that contains the first line (L) and is parallel to the mounting hole axis (A).

20. The rotary cutting tool according to claim 16, wherein the cutting edge has a convexly curved shape when the cutting insert is viewed from the end surface thereof, and also has a convexly curved shape when the cutting insert is viewed from the side surface thereof.

21. The rotary cutting tool according to claim 16, wherein
- a pair of first cutting edges, which are opposite to each other, are each formed as the cutting edge on an intersecting ridgeline portion between the first end surface and the peripheral side surface,
- a pair of second cutting edges, which are opposite to each other, are each formed on an intersecting ridgeline portion between the second end surface and the peripheral side surface, and
- the first cutting edge and the second cutting edge are formed so as to be symmetrical with respect to the median plane.

22. The rotary cutting tool according to claim 16, wherein a recessed portion is formed on at least one of the first end surface and the second end surface.

23. The rotary cutting tool according to claim 22, wherein a bottom portion of the recessed portion is a flat plane.

24. The rotary cutting tool according to claim 16, wherein the peripheral side surface is formed substantially at a right angle with respect to the first end surface.

* * * * *